United States Patent [19]

Tanaka

[11] Patent Number: 4,824,226
[45] Date of Patent: Apr. 25, 1989

[54] COMPACT ZOOM LENS SYSTEM FOR VIDEO CAMERA

[75] Inventor: Masami Tanaka, Hirakata, Japan

[73] Assignee: Minolta Camera Kabushiki Kaisha, Osaka, Japan

[21] Appl. No.: 82,200

[22] Filed: Aug. 5, 1987

[30] Foreign Application Priority Data

Aug. 12, 1986 [JP] Japan .................................. 61-188873
Aug. 12, 1986 [JP] Japan .................................. 61-188874

[51] Int. Cl.$^4$ .......................... G02B 15/16; G02B 9/64
[52] U.S. Cl. ...................................... 350/427; 350/423
[58] Field of Search ......................... 350/427, 423, 428

[56] References Cited

U.S. PATENT DOCUMENTS

| | | | |
|---|---|---|---|
| 4,621,905 | 11/1986 | Kato et al. | 350/427 |
| 4,629,293 | 12/1986 | Mihara | 350/427 |
| 4,699,474 | 10/1987 | Ozawa | 350/247 |
| 4,720,181 | 1/1988 | Hata | 350/427 |

FOREIGN PATENT DOCUMENTS 58-150926 9/1983 Japan .

Primary Examiner—John K. Corbin
Assistant Examiner—Terry S. Callaghan
Attorney, Agent, or Firm—Price, Gess & Ubell

[57] ABSTRACT

A comapct zoom lens system for video camera is provided which comprises from the object side to the image side; a first lens group of a positive refractive power fixed on the optical axis of the lens system; a second group of a negative refractive power shiftable along the optical axis in the zooming operation; a third lens group of a negative refractive power shiftable in the zooming operation and in the focusing operation; a fourth lens group of a positive refractive power fixed on the optical axis and consisting of at most two positive lens components; an aperture diaphragm; and a fifth lens group including, a front lens unit consisting of a positive lens component having a stronger refractive surface on the object side and a negative lens component having a stronger refractive surface on the object side, and a rear lens unit of a positive refractive power consisting of a positive lens component, a negative meniscus lens component having an objective side surface convex to the object side and a positive lens component having a stronger refractive surface on the object side.

8 Claims, 13 Drawing Sheets

FNO.=2.06

−0.1   0.1
Spherical   Sine
Aberration   Condition

— d
---- SC

Y'=4.2

−0.1   0.1
Astigmatism

---- DM
— DS

Y'=4.2

−4.0   4.0
Distortion (%)

FNO.=1.65

−0.1   0.1
Spherical   Sine
Aberration   Condition

— d
---- SC

Y'=4.2

−0.1   0.1
Astigmatism

---- DM
— DS

Y'=4.2

−4.0   4.0
Distortion (%)

FNO.=1.65

−0.1   0.1
Spherical   Sine
Aberration   Condition

— d
---- SC

Y'=4.2

−0.1   0.1
Astigmatism

---- DM
— DS

Y'=4.2

−4.0   4.0
Distortion (%)

FNO.=2.06

−0.1  0.1
Spherical  Sine
Aberration  Condition
—— d
---- SC

Y'=4.2

−0.1  0.1
Astigmatism
---- DM
—— DS

Y'=4.2

−4.0  4.0
Distortion (%)

FNO.=1.65

−0.1  0.1
Spherical  Sine
Aberration  Condition
—— d
---- SC

Y'=4.2

−0.1  0.1
Astigmatism
---- DM
—— DS

Y'=4.2

−4.0  4.0
Distortion (%)

FNO.=1.65

−0.1  0.1
Spherical  Sine
Aberration  Condition
—— d
---- SC

Y'=4.2

−0.1  0.1
Astigmat
---- DM
—— DS

Y'=4.2

−4.0  4.0
Distortion (%)

FNO.=2.06
— d
---- SC
-0.1  0.1
Spherical  Sine
Aberration Condition

Y'=4.2
---- DM
— DS
-0.1  0.1
Astigmatism

Y'=4.2
-4.0  4.0
Distortion (%)

FNO.=1.65
— d
---- SC
-0.1  0.1
Spherical  Sine
Aberration Condition

Y'=4.2
---- DM
— DS
-0.1  0.1
Astigmatism

Y'=4.2
-4.0  4.0
Distortion (%)

FNO.=1.65
— d
---- SC
-0.1  0.1
Spherical  Sine
Aberration Condition

Y'=4.2
---- DM
— DS
-0.1  0.1
Astigmatism

Y'=4.2
-4.0  4.0
Distortion (%)

FNO.=2.09

−0.1　0.1
Spherical　Sine
Aberration　Condition

Y'=4.2

−0.1　0.1
Astigmatism

Y'=4.2

−4.0　4.0
Distortion (%)

FNO.=1.65

−0.1　0.1
Spherical　Sine
Aberration　Condition

Y'=4.2

−0.1　0.1
Astigmatism

Y'=4.2

−4.0　4.0
Distortion (%)

FNO.=1.65

−0.1　0.1
Spherical　Sine
Aberration　Condition

Y'=4.2

−0.1　0.1
Astigmatism

Y'=4.2

−4.0　4.0
Distortion (%)

FNO.=1.78

-0.1   0.1
Spherical   Sine
Aberration  Condition

— d
---- SC

Y'=4.2

-0.1   0.1
Astigmatism

---- DM
—— DS

Y'=4.2

-4.0   4.0
Distortion (%)

FNO.=1.22

-0.1   0.1
Spherical   Sine
Aberration  Condition

— d
---- SC

Y'=4.2

-0.1   0.1
Astigmatism

---- DM
—— DS

Y'=4.2

-4.0   4.0
Distortion (%)

FNO.=1.22

-0.1   0.1
Spherical   Sine
Aberration  Condition

— d
---- SC

Y'=4.2

-0.1   0.1
Astigmatism

---- DM
—— DS

Y'=4.2

-4.0   4.0
Distortion (%)

FNO.=2.52

—— d
---- SC

-0.1  0.1
Spherical    Sine
Aberration   Condition

Y'=4.2

---- DM
—— DS

-0.1  0.1
Astigmatism

Y'=4.2

-4.0  4.0
Distortion (%)

FNO.=1.65

—— d
---- SC

-0.1  0.1
Spherical    Sine
Aberration   Condition

Y'=4.2

---- DM
—— DS

-0.1  0.1
Astigmatism

Y'=4.2

-4.0  4.0
Distortion (%)

FNO.=1.65

—— d
---- SC

-0.1  0.1
Spherical    Sine
Aberration   Condition

Y'=4.2

---- DM
—— DS

-0.1  0.1
Astigmatism

Y'=4.2

-4.0  4.0
Distortion (%)

FNO.=2.08

—— d
---- SC

-0.1   0.1
Spherical  Sine
Aberration Condition

Y'=4.2

---- DM
—— DS

-0.1   0.1
Astigmatism

Y'=4.2

-4.0   4.0
Distortion (%)

FNO.=1.65

—— d
---- SC

-0.1   0.1
Spherical  Sine
Aberration Condition

Y'=4.2

---- DM
—— DS

-0.1   0.1
Astigmatism

Y'=4.2

-4.0   4.0
Distortion (%)

FNO.=1.65

—— d
---- SC

-0.1   0.1
Spherical  Sine
Aberration Condition

Y'=4.2

---- DM
—— DS

-0.1   0.1
Astigmatism

Y'=4.2

-4.0   4.0
Distortion (%)

FNO.=2.29

−0.1   0.1
Spherical   Sine
Aberration  Condition
— d
---- SC

Y=4.2

−0.1   0.1
Astigmatism
---- DM
— DS

Y=4.2

−4.0   4.0
Distortion (%)

FNO.=1.65

−0.1   0.1
Spherical   Sine
Aberration  Condition
— d
---- SC

Y=4.2

−0.1   0.1
Astigmatism
---- DM
— DS

Y=4.2

−4.0   4.0
Distortion (%)

FNO.=1.65

−0.1   0.1
Spherical   Sine
Aberration  Condition
— d
---- SC

Y=4.2

−0.1   0.1
Astigmatism
---- DM
— DS

Y=4.2

−4.0   4.0
Distortion (%)

COMPACT ZOOM LENS SYSTEM FOR VIDEO CAMERA

BACKGROUND OF THE INVENTION

1. Field of the Invention

The present invention relates to a compact zoom lens system for a video camera in which defocus of the lens system is automatically detected in the camera and the focusing operation of the lens system is automatically controlled by the camera.

2. Description of the Prior Art

Recently, since the compactness of a plurality of electric circuits contained in the video camera system including a lens system is improved, the lens system comprises a large proportion of the size and the weight of the whole video camera system. Also, the cost of the lens system represents a significant percentage of the cost in the whole video camera system. Therefore, a lens system for use in a video camera system is required to be compact in size, light in weight and low in cost.

Conventionally, there is known a four component zoom lens system for a video camera comprising from the object side, a first positive focusing lens group, a second negative variator lens group, a third negative compensator lens group, and a fourth positive master lens group, for example, by Japanese Laid-Open Patent Application No. 61-93423. In the zoom lens system of this type, the first positive focusing lens group is shiftable along the optical axis in the focusing operation. Therefore, the diameter of the first positive focusing lens group is very large, and possess over 60% in weight and size of the whole lens system. Thus, it is difficult for making a lens system more compact and lighter, if a zoom lens system of this type is applied.

Here, in order to decrease the diameter of the first positive focusing lens group, the zoom lens system of a plurality of other types has been proposed in which a part of the variator lens group, the compensator lens group, the master lens group, a part of the compensator lens group, or a part of the master lens group is shiftable in the focusing operation. However, in the zoom lens systems of the types described above, the shifting distance of the focusing unit shiftable in the focusing operation is changed in accordance with the change of the focal length of the lens system due to the zooming operation. Therefore, the shifting mechanism becomes complex in construction. However, in recent video camera systems the shifting distance of the focusing unit can be automatically controlled by an automatic focusing unit provided in the video camera system by using a comparatively simple construction.

Another approach for making the zoom lens system more compact is to shift a plurality of lens groups in the zooming operation. However, the construction of such a focusing mechanism becomes more complex and increases the cost, and furthermore, such an approach has the following problems.

If the focusing lens unit is divided by two components which includes a first component located on the object side of an aperture diaphragm and a second component located on the image side thereof, an interlocking mechanism for interlocking the first lens component with the second component becomes very large, since an automatic aperture control mechanism provided for automatically controlling the aperture diaphragm is very large compared with the diameter of the lens groups. Therefore, the diameter of the whole lens system including the lens barrels becomes undesirably large. As a result, it is difficult to make the zoom lens system more compact when applying the above type of zoom lens system.

Furthermore, a zoom lens system of a type in which the first positive focusing lens group is shiftable also in the zooming operation, requires an additional interlocking mechanism for interlocking the first positive focusing lens group with the other focusing unit, in comparison with the zoom lens system in which the first positive focusing lens group is fixed in the zooming operation. Since it causes an increase in the size of the lens barrels, it is difficult to making the zoom lens system more compact.

SUMMARY OF THE INVENTION

An object of the present invention is to provide a zoom lens system for a video camera in which the construction of the zoom lens system becomes more simple in construction, the compactness thereof is improved, and the cost thereof can be decreased.

The other object of the present invention is to provide a zoom lens system for a video camera in which the various aberrations are well corrected all over the focal length range.

Another object of the present invention is to provide a zoom lens system for a video camera in which the lens system is suitable for an automatic focusing device provided in the video camera system.

A further object of the present invention is to provide a zoom lens system for a video camera in which the compensator lens group of the above-described four component zoom lens system is used for a focusing operation.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

To achieve the above-described objects, the present invention provides a compact zoom lens system for a video camera, comprising from the object side to the image side; a first lens group of a positive refractive power fixed on the optical axis of the lens system; a second group of a negative refractive power shiftable along the optical axis in the zooming operation; a third lens group of a negative refractive power shiftable in the zooming operation and in the focusing operation; a fourth lens group of a positive refractive power fixed on the optical axis and including at most two positive lens components; an aperture diaphragm; and a fifth lens group including, a front lens unit consisting of a positive lens component having a stronger refractive surface on the object side and a negative lens component having a stronger refractive surface on the object side, and a rear lens unit of a positive refractive power consisting of a positive lens component, a negative meniscus lens component having an objective side surface convex to the object side, and a positive lens component having a stronger refractive surface on the object side; wherein the lens system fulfills the following condition:

$$0.72 < \phi_4/\phi_{5B} < 2.0$$

wherein; $\phi_4$ represents the refractive power of the fourth lens group; and $\phi_{5B}$ represents the refractive power of the rear lens unit of the fifth lens group.

DETAILED DESCRIPTION OF THE PREFERRED EMBODIMENTS

Figure 1:
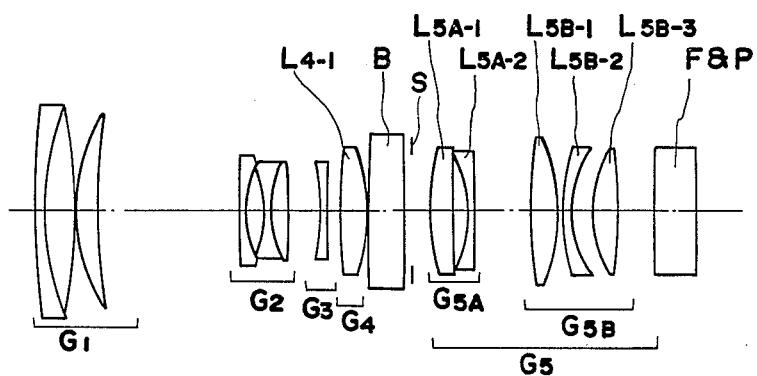
FIG. 1 represents a cross sectional view of the lens system according to a first embodiment of the present invention.

The following specification, taken in conjunction with the drawings, sets forth the preferred embodiments of the present invention. The embodiments of the invention disclosed herein are the best modes contemplated by the inventor for carrying out his invention in the commercial video camera, although it should be understood that various modifications can be accomplished within the parameters of the present invention.

In the drawings, schematic cross sectional views disclose the position of the lens groups and lens elements for the longest focal length. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conditions of an object at the left-hand side of the drawing and the image plane at the right-hand side.

Figure 2:
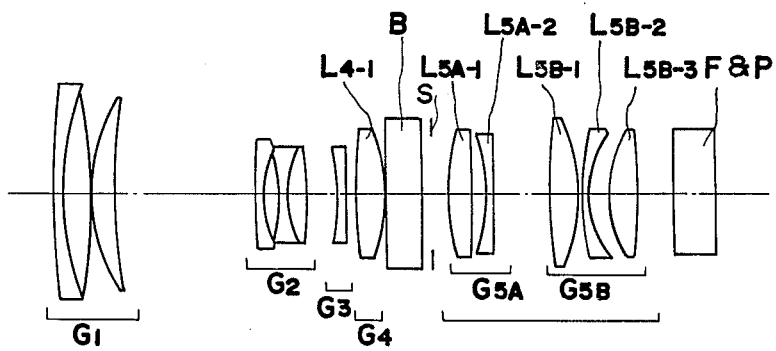
FIG. 2 represents a cross sectional view of the lens system according to a second embodiment of the present invention.
Figure 3:
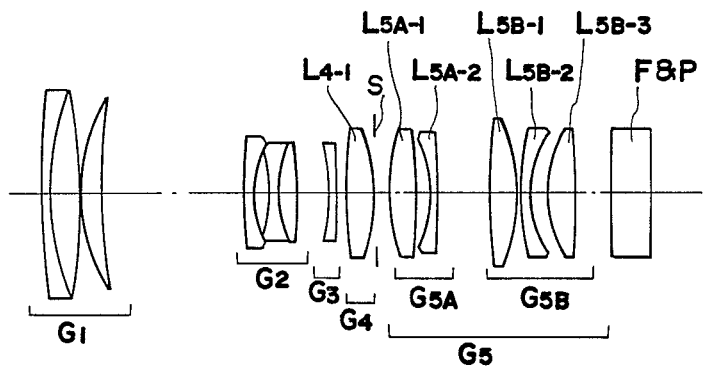
FIG. 3 represents a cross sectional view of the lens system according to a third embodiment of the present invention.
Figure 4:
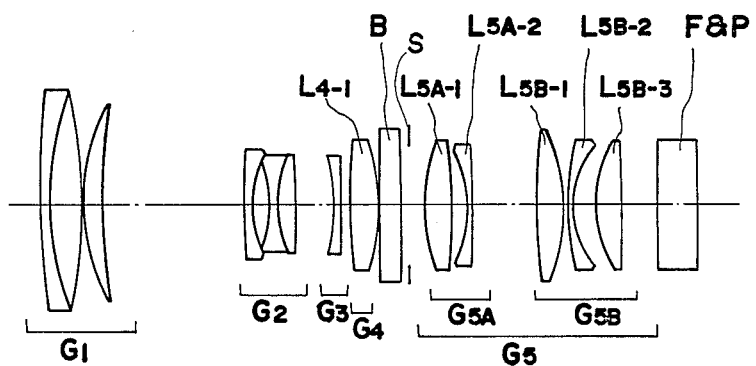
FIG. 4 represents a cross sectional view of the lens system according to a fourth embodiment of the present invention.
Figure 5:
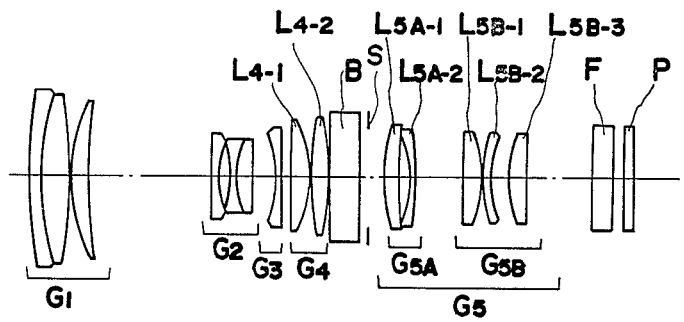
FIG. 5 represents a cross sectional view of the lens system according to a fifth embodiment of the present invention.
Figure 6:
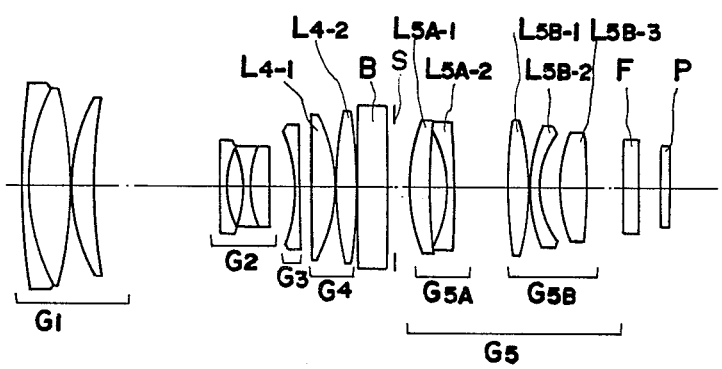
FIG. 6 represents a cross sectional view of the lens system according to a sixth embodiment of the present invention.
Figure 7:
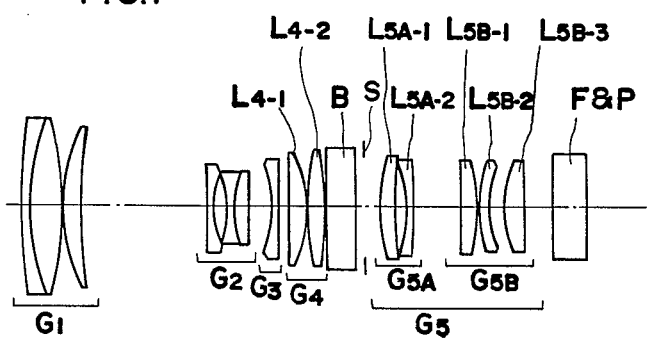
FIG. 7 represents a cross sectional view of the lens system according to a seventh embodiment of the present invention.
Figure 8:
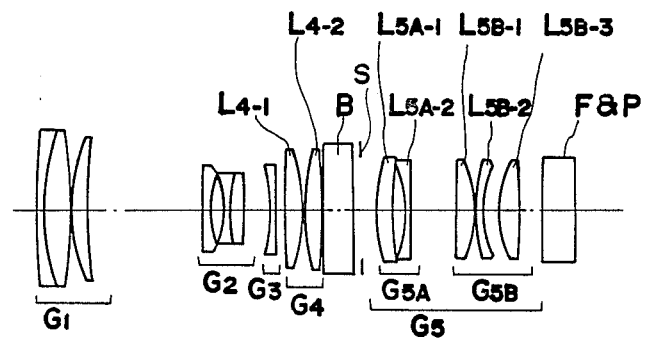
FIG. 8 represents a cross sectional view of the lens system according to a eighth embodiment of the present invention.
Figure 9:
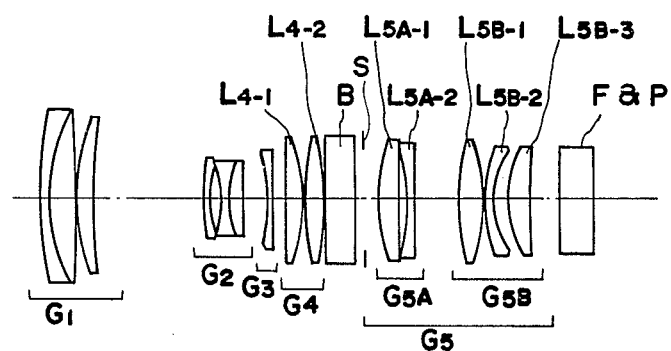
FIG. 9 represents a cross sectional view of the lens system according to a ninth embodiment of the present invention.
Figure 10A:
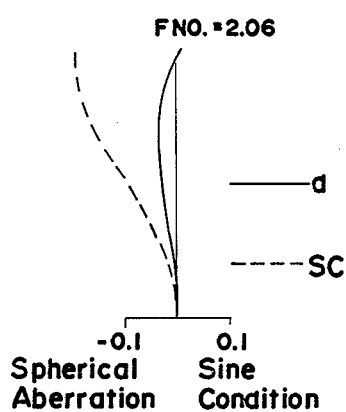
FIGS. 10(a) to 10(c) represent the aberration curves of the first embodiment for the longest focal length.
Figure 10B:
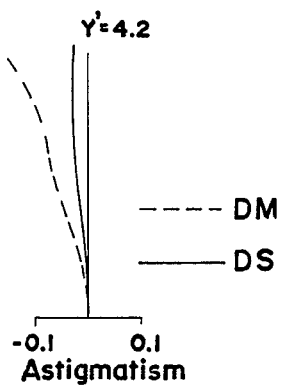
Figure 10C:
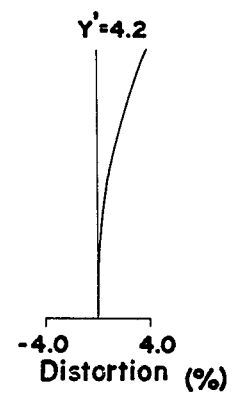
Figure 11A:
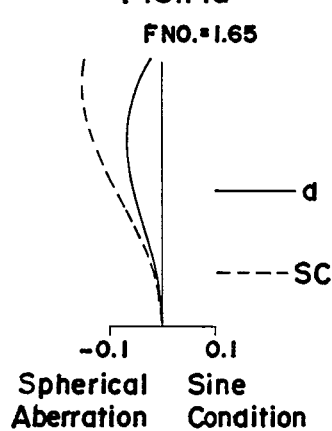
FIGS. 11(a) to 11(c) represent the aberration curves of the first embodiment for the medium focal length.
Figure 11B:
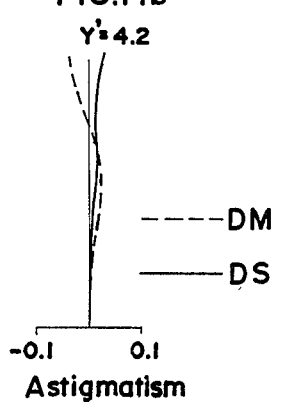
Figure 11C:
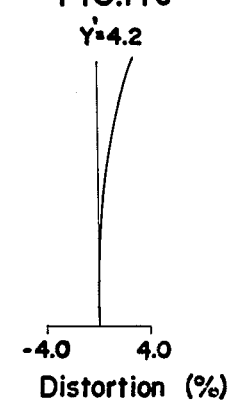
Figure 12A:
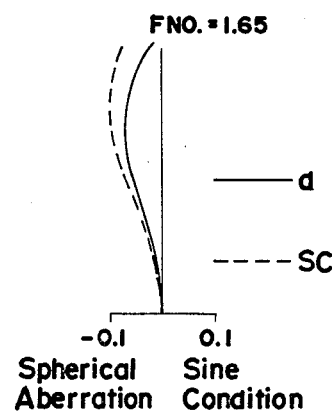
FIGS. 12(a) to 12(c) represent the aberration curves of the first embodiment for the shortest focal length.
Figure 12B:
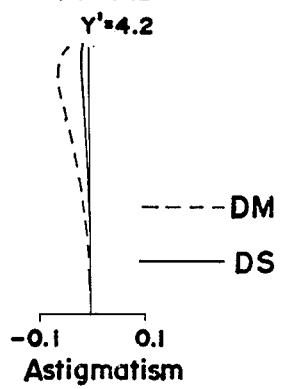
Figure 12C:
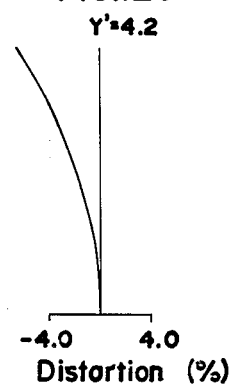
Figure 13A:
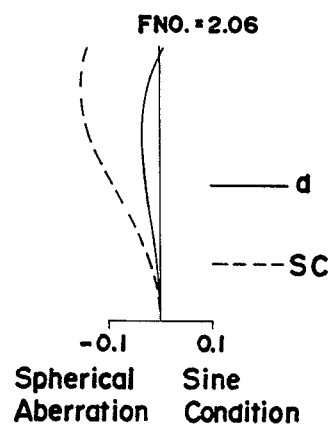
FIGS. 13(a) to 13(c) represent the aberration curves of the second embodiment for the longest focal length.
Figure 13B:
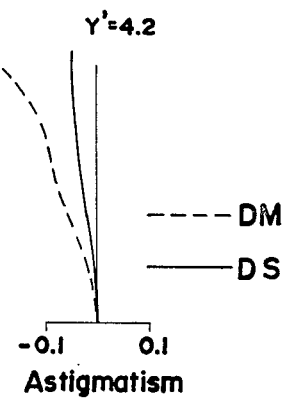
Figure 13C:
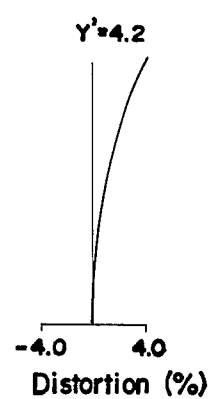
Figure 14A:
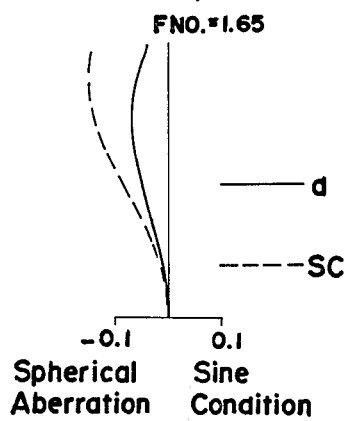
FIGS. 14(a) to 14(c) represent the aberration curves of the second embodiment for the medium focal length.
Figure 14B:
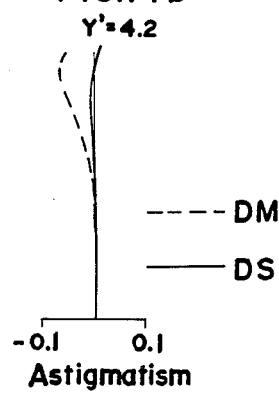
Figure 14C:
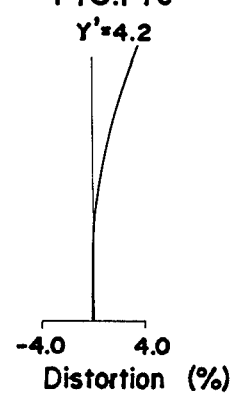
Figure 15A:
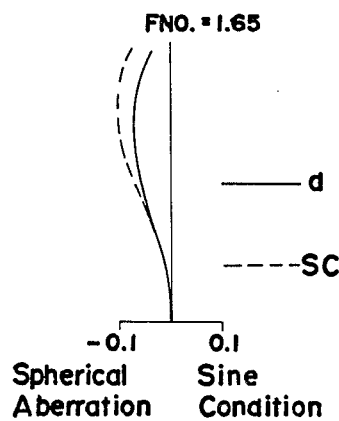
FIGS. 15(a) to 15(c) represent the aberration curves of the second embodiment for the shortest focal length.
Figure 15B:
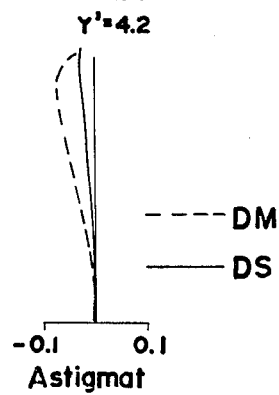
Figure 15C:
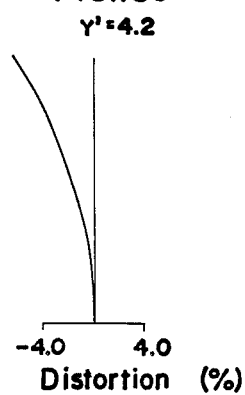
Figure 16A:
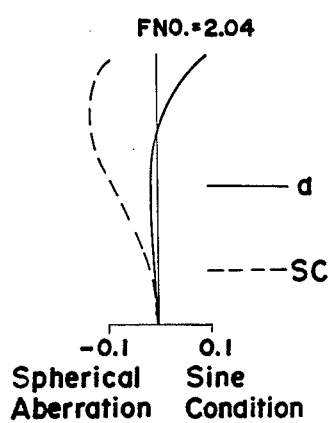
FIGS. 16(a) to 16(c) represent the aberration curves of the third embodiment for the longest focal length.
Figure 16B:
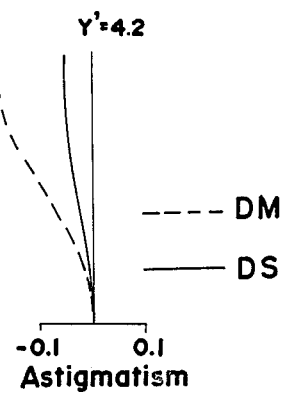
Figure 16C:
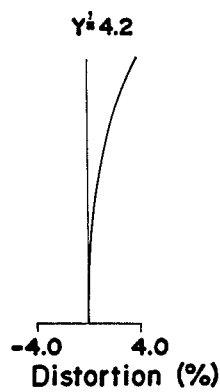
Figure 17A:
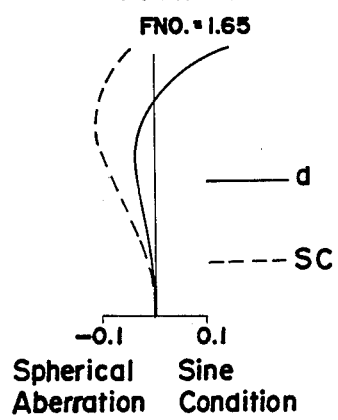
FIGS. 17(a) to 17(c) represent the aberration curves of the third embodiment for the medium focal length.
Figure 17B:
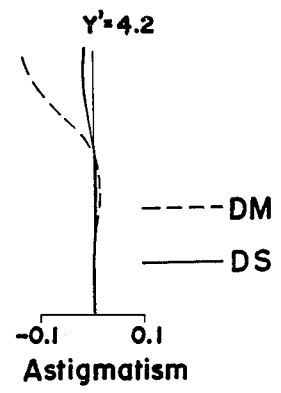
Figure 17C:
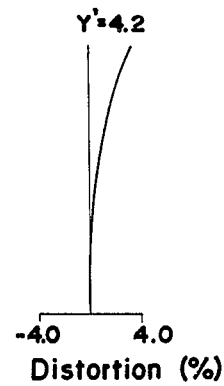
Figure 18A:
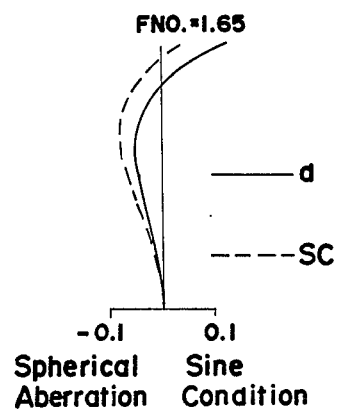
FIGS. 18(a) to 18(c) represent the aberration curves of the third embodiment for the shortest focal length.
Figure 18B:
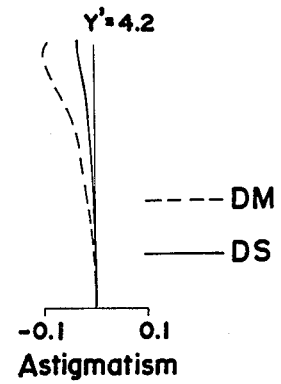
Figure 18C:
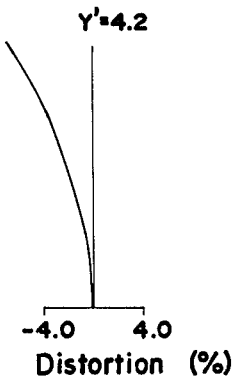
Figure 19A:
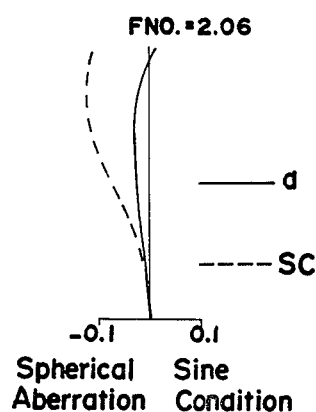
FIGS. 19(a) to 19(c) represent the aberration curves of the fourth embodiment for the longest focal length.
Figure 19B:
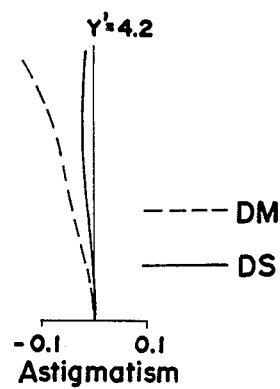
Figure 19C:
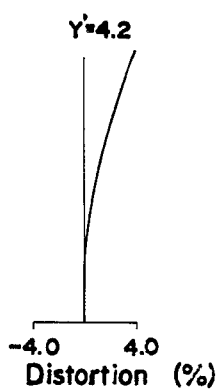
Figure 20A:
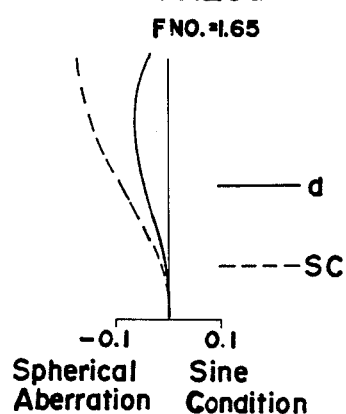
FIGS. 20(a) to 20(c) represent the aberration curves of the fourth embodiment for the medium focal length.
Figure 20B:
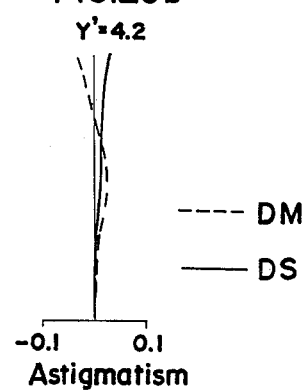
Figure 20C:
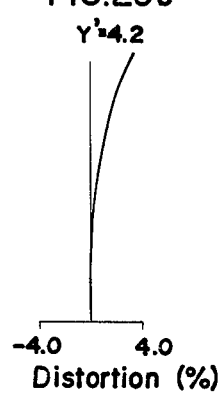
Figure 21A:
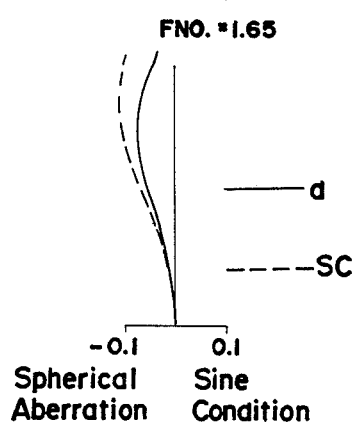
FIGS. 21(a) to 21(c) represent the aberration curves of the fourth embodiment for the shortest focal length.
Figure 21B:
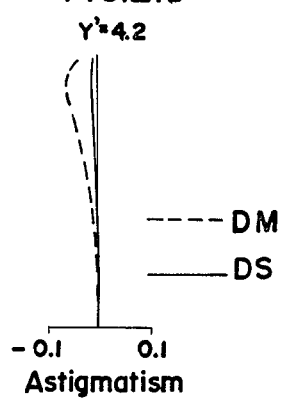
Figure 21C:
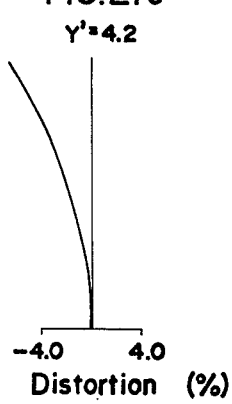
Figure 22A:
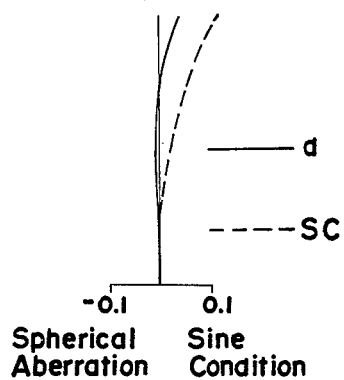
FIGS. 22(a) to 22(c) represent the aberration curves of the fifth embodiment for the longest focal length.
Figure 22B:
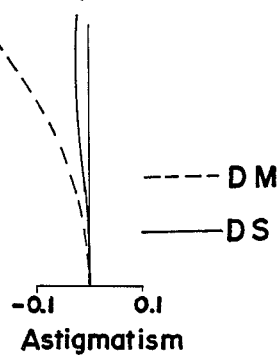
Figure 22C:
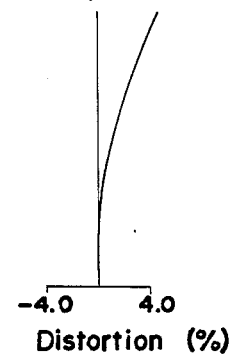
Figure 23A:
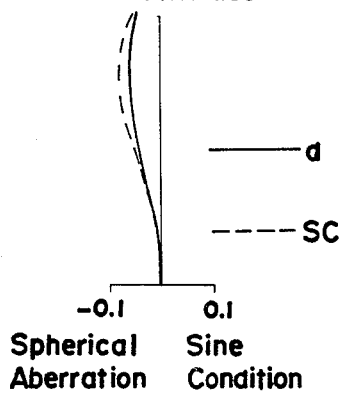
FIGS. 23(a) to 23(c) represent the aberration curves of the fifth embodiment for the medium focal length.
Figure 23B:
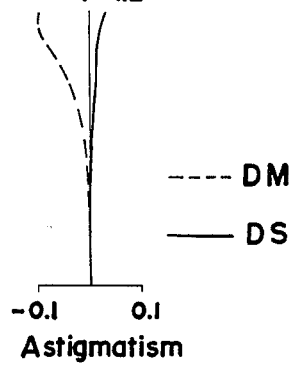
Figure 23C:
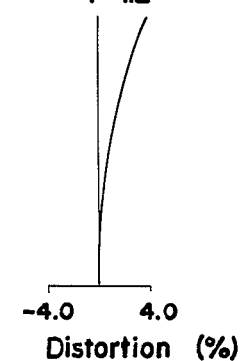
Figure 24A:
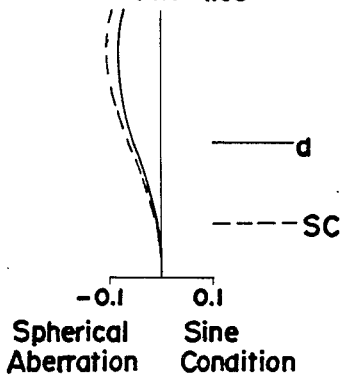
FIGS. 24(a) to 24(c) represent the aberration curves of the fifth embodiment for the shortest focal length.
Figure 24B:
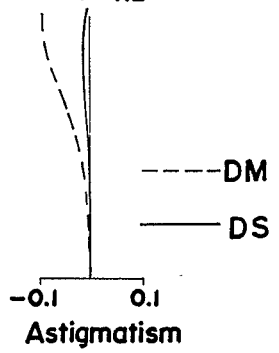
Figure 24C:
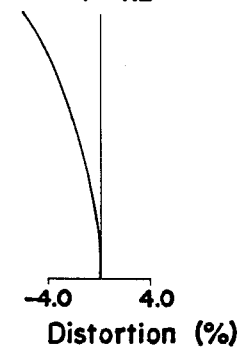
Figure 25A:
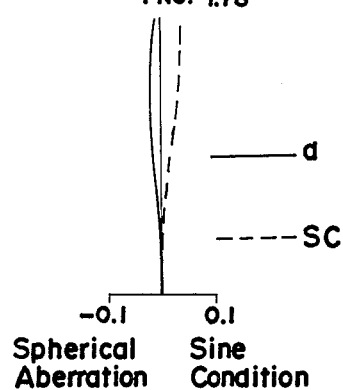
FIGS. 25(a) to 25(c) represent the aberration curves of the sixth embodiment for the longest focal length.
Figure 25B:
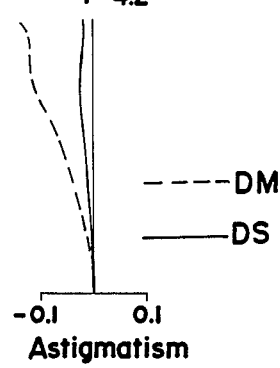
Figure 25C:
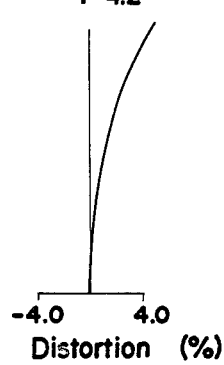
Figure 26A:
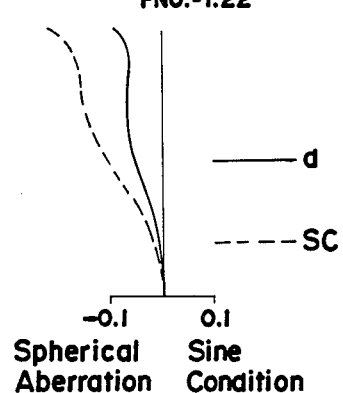
FIGS. 26(a) to 26(c) represent the aberration curves of the sixth embodiment for the medium focal length.
Figure 26B:
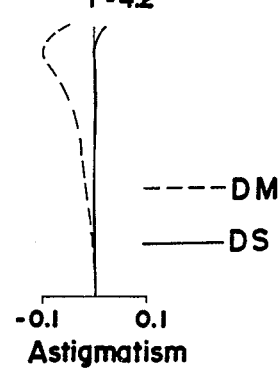
Figure 26C:
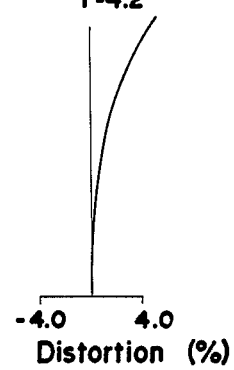
Figure 27A:
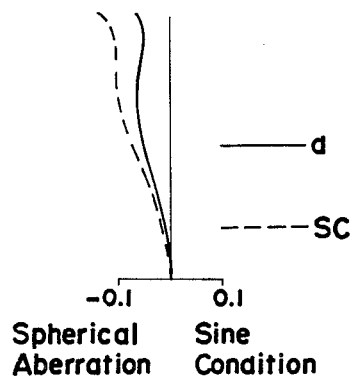
FIGS. 27(a) to 27(c) represent the aberration curves of the sixth embodiment for the shortest focal length.
Figure 27B:
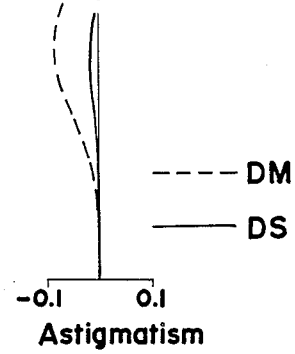
Figure 27C:
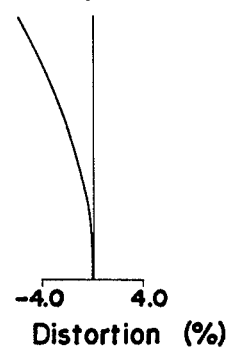
Figure 28A:
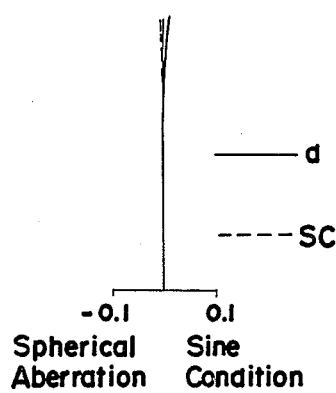
FIGS. 28(a) to 28(c) represent the aberration curves of the seventh embodiment for the longest focal length.
Figure 28B:
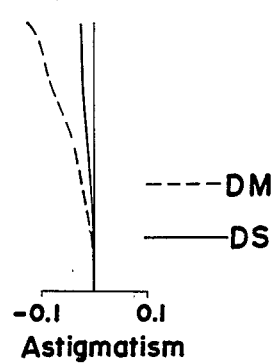
Figure 28C:
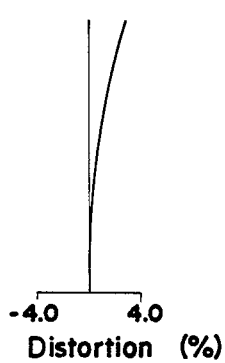
Figure 29A:
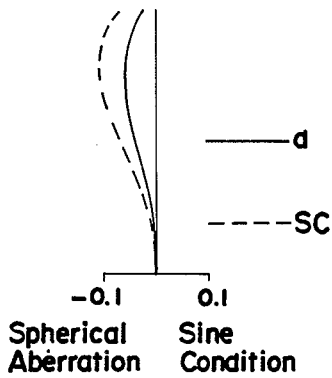
FIGS. 29(a) to 29(c) represent the aberration curves of the seventh embodiment for the medium focal length.
Figure 29B:
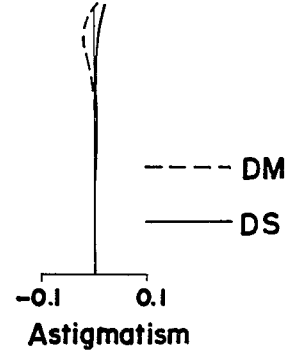
Figure 29C:
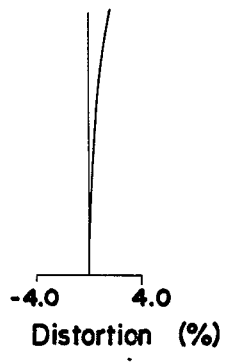
Figure 30A:
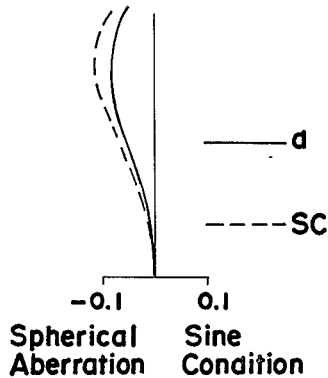
FIGS. 30(a) to 30(c) represent the aberration curves of the seventh embodiment for the shortest focal length.
Figure 30B:
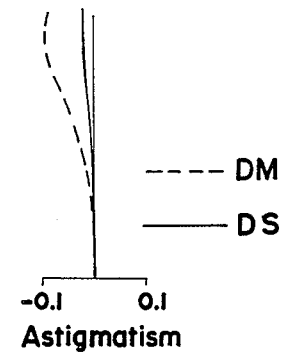
Figure 30C:
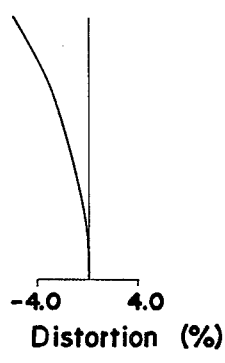
Figure 31A:
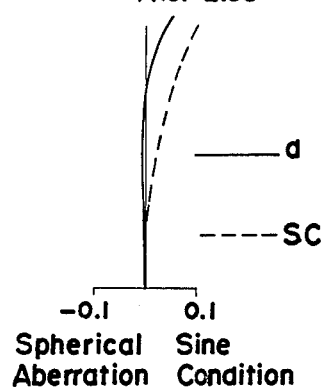
FIGS. 31(a) to 31(c) represent the aberration curves of the eighth embodiment for the longest focal length.
Figure 31B:
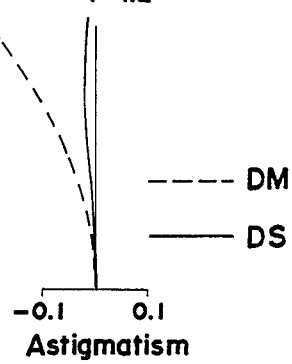
Figure 31C:
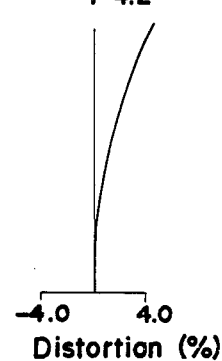
Figure 32A:
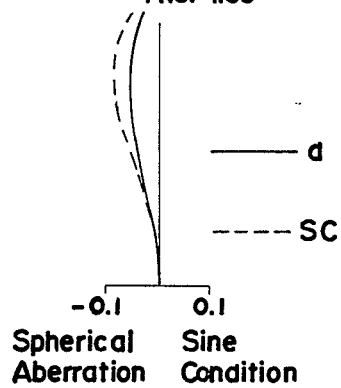
FIGS. 32(a) to 32(c) represent the aberration curves of the eighth embodiment for the medium focal length.
Figure 32B:
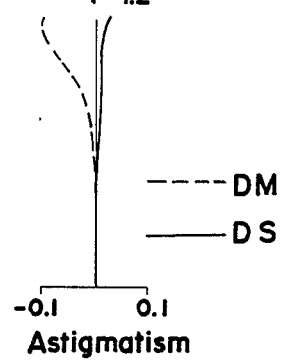
Figure 32C:
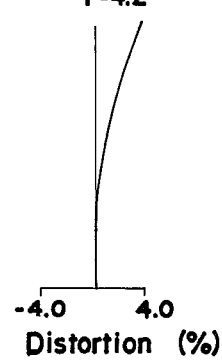
Figure 33A:
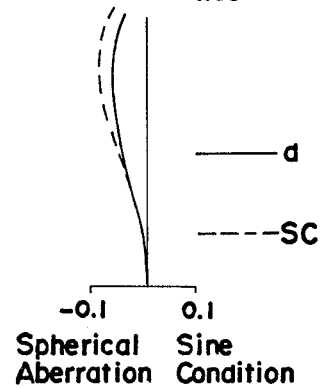
FIGS. 33(a) to 33(c) represent the aberration curves of the eighth embodiment for the shortest focal length.
Figure 33B:
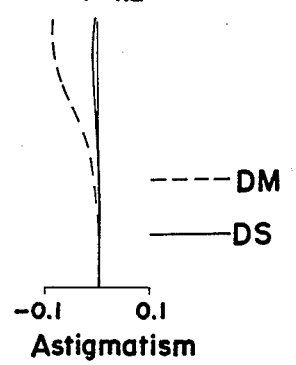
Figure 33C:
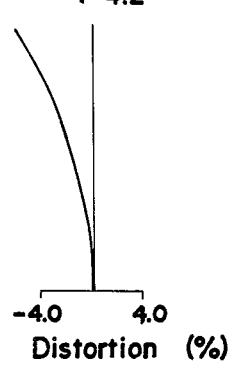
Figure 34A:
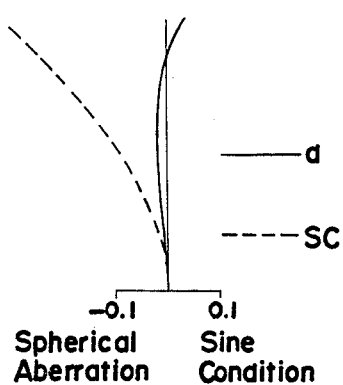
FIGS. 34(a) to 34(c) represent the aberration curves of the ninth embodiment for the longest focal length.
Figure 34B:
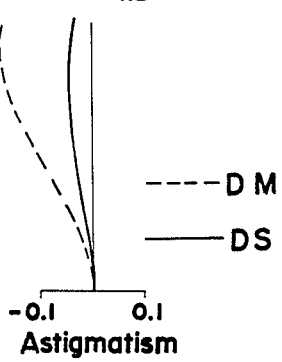
Figure 34C:
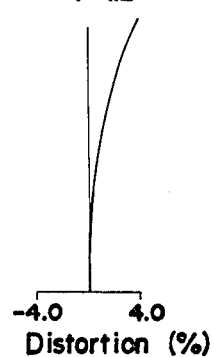
Figure 35A:
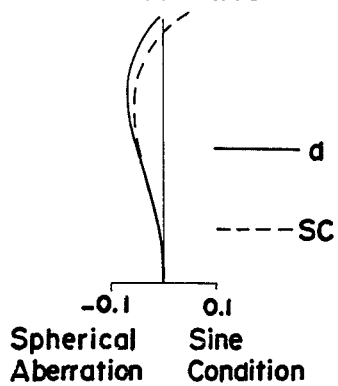
FIGS. 35(a) to 35(c) represent the aberration curves of the ninth embodiment for the medium focal length.
Figure 35B:
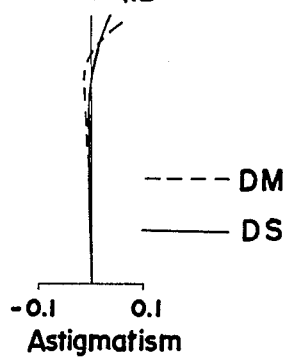
Figure 35C:
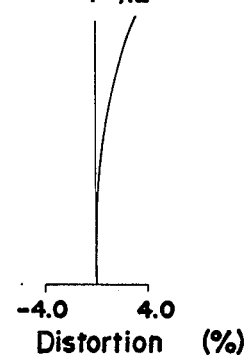
Figure 36A:
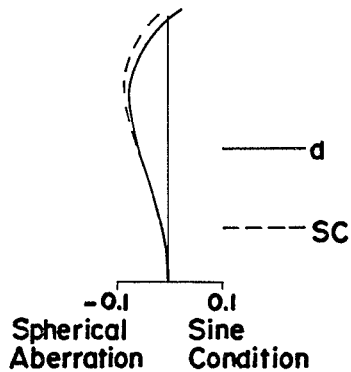
FIGS. 36(a) to 36(c) represent the aberration curves of the ninth embodiment for the shortest focal length.
Figure 36B:
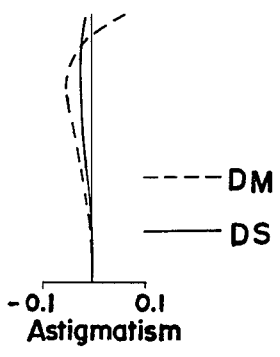
Figure 36C:
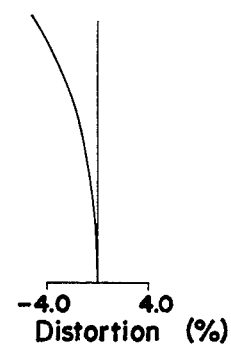

According to the present invention, as shown in FIGS. 1 to 9, a compact zoom lens system for a video camera, comprising from the object side to the image side; a first lens group ($G_1$) of a positive refractive power fixed on the optical axis of the lens system; a second group ($G_2$) of a negative refractive power shiftable along the optical axis in the zooming operation; a third lens group ($G_3$) of a negative refractive power shiftable in the zooming operation and in the focusing operation; a fourth lens group ($G_4$) of a positive refractive power fixed on the optical axis of the lens system and consisting of at most two positive lens components; an aperture diaphragm (S); and a fifth lens group ($G_5$) including, a front lens unit ($G_{5A}$) consisting of a positive lens component ($L_{5A-1}$) having a stronger refractive surface on the object side and a negative lens component ($L_{5A-2}$) having a stronger refractive surface on the object side, and a rear lens unit ($G_{5B}$) of a positive refractive power consisting of a positive lens component ($L_{5B-1}$), a negative meniscus lens component ($L_{5B-2}$) having an objective side surface convex to the object side and a positive lens component ($L_{5B-3}$) having a stronger refractive surface on the object side; wherein the lens system fulfills the following condition:

$$0.72 < \phi_4/\phi_{5B} < 2.0 \qquad (1)$$

wherein; $\phi_4$ represents the refractive power of the fourth lens group (G4); and $\phi_{5B}$ represents the refractive power of the rear lens unit (G$_{5B}$) of the fifth lens group (G5).

Here, the refractive power of the rear lens unit (G$_{5B}$) of the fifth lens group (G5) is one of the factors for determining the compound refractive power of the fifth lens group (G5). Thus, a value obtained by dividing the refractive power of the fourth lens group (G4) by the refractive power of the rear lens unit (G$_{5B}$) of the fifth lens group (G5), that is a parameter of the condition (1), can be considered to be almost constant independent of the focal length range of the zoom lens system.

If the compensator lens group of the above-described four component zoom lens system is shiftable in the focusing operation as described above, the axial air space between the variator lens group and the compensator lens group may be extended in comparison with the normal four component zoom lens system in which the first focusing lens group is shiftable in the focusing operation. Therefore, since afocal magnification in the zooming unit consisting of the variator lens group and the compensator lens group becomes small, the focal length of the master lens group should be extended, if the identical F-number is kept. Additionally, the Petzval sum of the lens system changes in the negative direction. Furthermore, the aberration correction becomes more difficult, since the Petzval sum of such a zoom lens system is naturally negative. And the diameter of the aperture diaphragm becomes large, since the focal length of the master lens group becomes long, if the identical F-number is kept.

Here, as described above, it is desired to make the automatic aperture control mechanism more compact in the video camera. Thus, the diameter of the aperture diaphragm can be decreased by increasing the refractive power of the fourth lens group so that the converging light is incident on the aperture diaphragm. Additionally, if the refractive power of the fourth lens group is increased, the Petzval sum changes in the positive direction and therefore, the aberration correction becomes easier. Furthermore, if the refractive power of the fourth lens group is increased, the back focal length of the whole lens system can be shortened, and the total length of the whole lens system can be shortened. And, since, the position of height through which the light bundle passes in the master lens group can be lowered, it becomes possible to make the master lens group more compact.

The above described condition (1) defines the refractive power of the fourth lens group (G4). If the refractive power of the fourth lens group (G4) becomes weak to violate the lower limit of the condition (1), since the light bundle incident on the aperture diaphragm (S) is not sufficiently converged by the fourth lens group (G4) located in front of the aperture diaphragm (S), the diameter of the aperture diaphragm (S) can not be decreased sufficiently. Thus, it is difficult to make the lens system compact in size and light in weight, and the aberrations can not be corrected well. On the other hand, if the upper limit of condition (1) is violated, residual aberrations, especially the coma aberration, becomes large and it cannot be corrected well.

In the present invention, it is desirable to further fulfill the following condition:

$$0.13 < |\phi_3| \times d_2 < 0.20 \qquad (2)$$

wherein, $\phi_3$ represents the refractive power of the third lens group (G3); and d$_2$ represents the axial distance between the second lens group (G2) and the third lens group (G3) in the infinity focusing position in the longest focal length condition.

Condition (2) defines the relation between the refractive power of the third lens group (G3) shiftable in the focusing operation and the space necessary for the focusing operation. If the lower limit of the condition (2) is violated, desirable minimum object distance can not be obtained in the longest focal length condition in which the shifting distance of the third lens group (G3) becomes large, resulting in the deterioration of the optical performance of the lens system. On the other hand, if the upper limit of the condition (2) is violated, since a distance from a first lens component located at the object side in the first lens group (G1) to the aperture diaphragm (S) becomes too long, the marginal rays to be passed through the position further from the optical axis are difficult to be received on the image plane in the medium focal length condition. Thus, to avoid this, the diameter of the first lens group becomes large. Additionally, the afocal magnification becomes small, causing the increase of the fourth lens group (G4) and the fifth lens group (G5) in size.

In the present invention, if the fourth lens group (G4) consists of only two positive lens components (L$_{4-1}$) and (L$_{4-2}$), as shown in FIGS. 5 to 9, it is desirable to fulfill the following condition:

$$1.18 < \phi_4/\phi_{5B} < 2.0 \qquad (3)$$

If the lower limit of the condition (3) is violated, since the light bundle incident on the aperture diaphragm (S) is not sufficiently converged by the fourth lens group (G4) located in front of the aperture diaphragm (S), the diameter of the aperture diaphragm (S) can not be decreased sufficiently. Thus, it is difficult to make the lens system compact in size and light in weight while keeping the desirable optical performance and the desirable F-number, and the aberrations can not be corrected well. On the other hand, if the upper limit of condition (3) is violated, residual aberrations, especially the coma aberration, becomes large and it cannot be corrected well, as in the case in which the upper limit of the condition (1) is violated.

In the present invention, it is further effective for decreasing the cost to construct the fourth lens group (G4) by only one positive lens component (L$_{4-1}$) fixed on the optical axis, as shown in FIGS. 1 to 4. In this case, it is desirable to fulfill the following condition:

$$0.72 < \phi_4/\phi_{5B} < 1.18 \qquad (4)$$

If the lower limit of the condition (4) is violated, since the light bundle incident on the aperture diaphragm (S) is not sufficiently converged by the fourth lens group (G4) located in front of the aperture diaphragm (S), the diameter of the aperture diaphragm (S) can not be decreased sufficiently. Thus, it is difficult to make the lens system compact in size and light in weight, and the aberrations can not be corrected well. Contrary, if the upper limit of condition (4) is violated, the resolving power in optical performance is deteriorated.

Here, the diameter of the first lens group (G1) is determined in accordance with the marginal rays to be passed through the position further from the optical axis in the medium focal length condition. It is effective for keeping the sufficient luminance caused by the marginal rays passed through the position further from the optical axis in the maximum F-number condition. Here, in the present invention, the positive refractive power is designed to be relatively small and the negative refractive power is designed to be relatively large in a position in which such marginal rays pass through the relatively high height from the optical axis, in order to pass more marginal rays through the aperture diaphragm. Namely, in the present invention, an object side surface of a first lens element located at the object side in the first lens group and an object side surface of a first lens element located at the object side in the second lens group have a relatively small positive refractive power, while an image side surface of the first lens element of the second lens group has a relatively large negative refractive power, in order that the light rays incident on the lens surfaces at a higher height are refracted slightly.

Thus, the diameter of the first lens group ($G_1$) can be decreased sufficiently, and therefore the first lens group ($G_1$) represents under 50% in weight and size of the whole lens system. Therefore the zoom lens system becomes very compact. And the cost of the lens system can be also be decreased. For example, in comparison with the lens system disclosed in Japanese Laid-Open Patent Application No. 61-93423, the diameter of the first lens group ($G_1$) decreases by about 15% and the weight thereof decreases by about 18% in the zoom lens system of the embodiments according to the present invention.

The following Tables 1 to 9 disclose, respectively, the first to ninth embodiments of the present invention. In the Tables, f equals the focal length, $F_{NO}$ equals the F-number, $2\omega$ equals the angle of view, r is radius of curvature with respective sub number indicating the surfaces from the object side to the image side along the optical axis, d represents the axial distance and includes both the air spaces and the actual thickness of the lenses along the optical axis, N equals the refractive index and again, the sub numbers refer to the particular optical element from the object side to the image side, and finally, $\nu$ equals the Abbe number and the sub numbers refer to the particular optical element from the object side to the image side. In the Tables 1 to 9 and in FIGS. 1 to 9, B represents a beam splitter, F represents a low-pass filter, and P represents a face plate. Furthermore, in the Tables 1 to 9, total length of the lens system is measured from the top surface of the lens system to the image plane.

TABLE 1

Embodiment 1

$f = 9.25-52.5 \quad F_{NO} = 1.65-2.06 \quad 2\omega = 48.32°-9.03°$

| Group | | Radius of Curvature | | Axial distance | Refractive index | | Abbe number | |
|---|---|---|---|---|---|---|---|---|
| $G_1$ | $r_1$ | 111.11111 | | | | | | |
| | | | $d_1$ | 1.3 | $N_1$ | 1.80518 | $\nu_1$ | 25.43 |
| | $r_2$ | 34.48986 | | | | | | |
| | | | $d_2$ | 4.8 | $N_2$ | 1.51680 | $\nu_2$ | 59.48 |
| | $r_3$ | −62.08512 | | | | | | |
| | | | $d_3$ | 0.1 | | | | |
| | $r_4$ | 25.48095 | | | | | | |
| | | | $d_4$ | 3.0 | $N_3$ | 1.71300 | $\nu_3$ | 53.93 |
| | $r_5$ | 74.57397 | | | | | | |
| | | | $d_5$ | *(variable) | | | | |
| $G_2$ | $r_6$ | 82.37049 | | | | | | |
| | | | $d_6$ | 0.9 | $N_4$ | 1.77250 | $\nu_4$ | 49.77 |
| | $r_7$ | 12.36447 | | | | | | |
| | | | $d_7$ | 2.8 | | | | |
| | $r_8$ | −14.74083 | | | | | | |
| | | | $d_8$ | 0.8 | $N_5$ | 1.71300 | $\nu_5$ | 53.93 |
| | $r_9$ | 13.77726 | | | | | | |
| | | | $d_9$ | 2.8 | $N_6$ | 1.80518 | $\nu_6$ | 25.43 |
| | $r_{10}$ | −67.43370 | | | | | | |
| | | | $d_{10}$ | *(variable) | | | | |
| $G_3$ | $r_{11}$ | −25.54968 | | | | | | |
| | | | $d_{11}$ | 0.9 | $N_7$ | 1.80500 | $\nu_7$ | 40.97 |
| | $r_{12}$ | 1659.35101 | | | | | | |
| | | | $d_{12}$ | *(variable) | | | | |
| $G_4$ | $r_{13}$ | 68.25202 | | | | | | |
| | | | $d_{13}$ | 4.0 | $N_8$ | 1.77250 | $\nu_8$ | 49.77 |
| | $r_{14}$ | −27.14722 | | | | | | |
| | | | $d_{14}$ | 0.2 | | | | |
| B | $r_{15}$ | ∞ | | | | | | |
| | | | $d_{15}$ | 5.0 | $N_9$ | 1.51680 | $\nu_9$ | 59.48 |
| | $r_{16}$ | ∞ | | | | | | |
| | | | $d_{16}$ | 1.5 | | | | |
| S | $r_{17}$ | (aperture) | | | | | | |
| | | | $d_{17}$ | 2.0 | | | | |
| $G_5$ / $G_{5A}$ | $r_{18}$ | 26.02677 | | | | | | |
| | | | $d_{18}$ | 3.8 | $N_{10}$ | 1.71300 | $\nu_{10}$ | 53.93 |
| | $r_{19}$ | −87.96916 | | | | | | |
| | | | $d_{19}$ | 2.1 | | | | |
| | $r_{20}$ | −17.93750 | | | | | | |
| | | | $d_{20}$ | 0.8 | $N_{11}$ | 1.80741 | $\nu_{11}$ | 31.59 |
| | $r_{21}$ | −154.14971 | | | | | | |
| | | | $d_{21}$ | 8.01 | | | | |
| | $r_{22}$ | 72.77422 | | | | | | |
| | | | $d_{22}$ | 4.0 | $N_{12}$ | 1.69350 | $\nu_{12}$ | 50.29 |
| | $r_{23}$ | −24.53085 | | | | | | |

TABLE 1-continued

Embodiment 1

|  |  |  |  |  |  |  |  |  |
|---|---|---|---|---|---|---|---|---|
| | | | $d_{23}$ | 0.48 | | | | |
| $G_{5B}$ | $r_{24}$ | 38.36134 | | | | | | |
| | | | $d_{24}$ | 0.8 | $N_{13}$ | 1.80518 | $\nu_{13}$ | 25.43 |
| | $r_{25}$ | 12.22151 | | | | | | |
| | | | $d_{25}$ | 3.14 | | | | |
| | $r_{26}$ | 16.71555 | | | | | | |
| | | | $d_{26}$ | 3.8 | $N_{14}$ | 1.72000 | $\nu_{14}$ | 50.31 |
| | $r_{27}$ | −92.99169 | | | | | | |
| | | | $d_{27}$ | 5.14 | | | | |
| F&P | $r_{28}$ | ∞ | | | | | | |
| | | | $d_{28}$ | 5.5 | $N_{15}$ | 1.51680 | $\nu_{15}$ | 59.48 |
| | $r_{29}$ | ∞ | | | | | | |

| f | $d_5$* | $d_{10}$* | $d_{12}$* |
|---|---|---|---|
| 9.25 | 1.0 | 19.534 | 5.528 |
| 22.0 | 12.891 | 6.710 | 6.461 |
| 52.5 | 19.962 | 4.6 | 1.5 |

Total length = 104.636
$\phi_4/\phi_{5B} = 0.903$
$|\phi_3| \times d_2 = 0.147$

TABLE 2

Embodiment 2 f = 9.25−52.5    $F_{NO}$ = 1.65−2.06    $2\omega$ = 48.32°−9.03°

| | | Radius of Curvature | Axial distance | | Refractive index | | Abbe number | |
|---|---|---|---|---|---|---|---|---|
| | $r_1$ | 111.11111 | | | | | | |
| | | | $d_1$ | 1.3 | $N_1$ | 1.80518 | $\nu_1$ | 25.43 |
| | $r_2$ | 34.53352 | | | | | | |
| | | | $d_2$ | 4.8 | $N_2$ | 1.51680 | $\nu_2$ | 59.48 |
| $G_1$ | $r_3$ | −62.02170 | | | | | | |
| | | | $d_3$ | 0.1 | | | | |
| | $r_4$ | 25.72312 | | | | | | |
| | | | $d_4$ | 3.0 | $N_3$ | 1.71300 | $\nu_3$ | 53.93 |
| | $r_5$ | 76.70563 | | | | | | |
| | | | $d_5$ | *(variable) | | | | |
| | $r_6$ | 68.66689 | | | | | | |
| | | | $d_6$ | 0.9 | $N_4$ | 1.77250 | $\nu_4$ | 49.77 |
| | $r_7$ | 12.37432 | | | | | | |
| | | | $d_7$ | 2.8 | | | | |
| $G_2$ | $r_8$ | −14.86682 | | | | | | |
| | | | $d_8$ | 0.8 | $N_5$ | 1.71300 | $\nu_5$ | 53.93 |
| | $r_9$ | 13.78948 | | | | | | |
| | | | $d_9$ | 2.8 | $N_6$ | 1.80518 | $\nu_6$ | 25.43 |
| | $r_{10}$ | −80.30449 | | | | | | |
| | | | $d_{10}$ | *(variable) | | | | |
| | $r_{11}$ | −26.20006 | | | | | | |
| $G_3$ | | | $d_{11}$ | 0.9 | $N_7$ | 1.80500 | $\nu_7$ | 40.97 |
| | $r_{12}$ | 641.10514 | | | | | | |
| | | | $d_{12}$ | *(variable) | | | | |
| | $r_{13}$ | 50.44187 | | | | | | |
| $G_4$ | | | $d_{13}$ | 4.0 | $N_8$ | 1.77250 | $\nu_8$ | 49.77 |
| | $r_{14}$ | −26.74399 | | | | | | |
| | | | $d_{14}$ | 0.2 | | | | |
| | $r_{15}$ | ∞ | | | | | | |
| B | | | $d_{15}$ | 5.0 | $N_9$ | 1.51680 | $\nu_9$ | 59.48 |
| | $r_{16}$ | ∞ | | | | | | |
| | | | $d_{16}$ | 1.5 | | | | |
| S | $r_{17}$ | (aperture) | | | | | | |
| | | | $d_{17}$ | 2.0 | | | | |
| | $r_{18}$ | 24.83499 | | | | | | |
| | | | $d_{18}$ | 3.8 | $N_{10}$ | 1.71300 | $\nu_{10}$ | 53.93 |
| | $r_{19}$ | −139.88225 | | | | | | |
| $G_{5A}$ | | | $d_{19}$ | 2.1 | | | | |
| | $r_{20}$ | −16.38216 | | | | | | |
| | | | $d_{20}$ | 0.8 | $N_{11}$ | 1.80741 | $\nu_{11}$ | 31.59 |
| | $r_{21}$ | −244.38585 | | | | | | |
| | | | $d_{21}$ | 8.09 | | | | |
| $G_5$ | $r_{22}$ | 66.99445 | | | | | | |
| | | | $d_{22}$ | 4.0 | $N_{12}$ | 1.69350 | $\nu_{12}$ | 50.29 |
| | $r_{23}$ | −23.22788 | | | | | | |
| | | | $d_{23}$ | 0.48 | | | | |
| | $r_{24}$ | 37.33765 | | | | | | |
| $G_{5B}$ | | | $d_{24}$ | 0.8 | $N_{13}$ | 1.80518 | $\nu_{13}$ | 25.43 |
| | $r_{25}$ | 12.00056 | | | | | | |
| | | | $d_{25}$ | 3.14 | | | | |
| | $r_{26}$ | 16.69376 | | | | | | |

TABLE 2-continued

Embodiment 2

|     |     |     | $d_{26}$ | 3.8 | $N_{14}$ | 1.72000 | $\nu_{14}$ | 50.31 |
|-----|-----|-----|----------|-----|----------|---------|------------|-------|
|     | $r_{27}$ | −69.45368 | $d_{27}$ | 5.14 |     |     |     |     |
| F&P | $r_{28}$ | ∞ | $d_{28}$ | 5.5 | $N_{15}$ | 1.51680 | $\nu_{15}$ | 59.48 |
|     | $r_{29}$ | ∞ |          |     |          |         |            |       |

| f | $d_5$* | $d_{10}$* | $d_{12}$* |
|---|--------|-----------|-----------|
| 9.25 | 1.0 | 19.367 | 5.633 |
| 22.0 | 12.85 | 6.602 | 6.548 |
| 52.5 | 19.9 | 4.6 | 1.5 |

Total length = 103.901
$\phi_4/\phi_{5B} = 0.921$
$|\phi_3| \times d_2 = 0.147$

TABLE 3

Embodiment 3 f = 9.25−52.5  $F_{NO}$ = 1.65−2.04  2ω = 48.32°−9.03°

|     |     |     | Radius of Curvature | Axial distance |     | Refractive index |     | Abbe number |
|-----|-----|-----|---------------------|----------------|-----|------------------|-----|-------------|
|     |     | $r_1$ | 111.11111 |          |     |         |            |       |
|     |     |     |           | $d_1$ | 1.3 | $N_1$ | 1.80518 | $\nu_1$ | 25.43 |
|     |     | $r_2$ | 34.11019 |          |     |         |            |       |
|     |     |     |           | $d_2$ | 4.8 | $N_2$ | 1.51680 | $\nu_2$ | 59.48 |
| $G_1$ |   | $r_3$ | −60.62752 |        |     |         |            |       |
|     |     |     |           | $d_3$ | 0.1 |         |         |            |       |
|     |     | $r_4$ | 25.60764 |          |     |         |            |       |
|     |     |     |           | $d_4$ | 3.0 | $N_3$ | 1.71300 | $\nu_3$ | 53.93 |
|     |     | $r_5$ | 74.77106 |          |     |         |            |       |
|     |     |     |           | $d_5$ | *(variable) |   |         |            |       |
|     |     | $r_6$ | 111.11111 |         |     |         |            |       |
|     |     |     |           | $d_6$ | 0.9 | $N_4$ | 1.77250 | $\nu_4$ | 49.77 |
|     |     | $r_7$ | 12.39389 |          |     |         |            |       |
|     |     |     |           | $d_7$ | 2.8 |         |         |            |       |
| $G_2$ |   | $r_8$ | −14.56022 |        |     |         |            |       |
|     |     |     |           | $d_8$ | 0.8 | $N_5$ | 1.71300 | $\nu_5$ | 53.93 |
|     |     | $r_9$ | 13.55883 |          |     |         |            |       |
|     |     |     |           | $d_9$ | 2.8 | $N_6$ | 1.80518 | $\nu_6$ | 25.43 |
|     |     | $r_{10}$ | −56.76601 |       |     |         |            |       |
|     |     |     |           | $d_{10}$ | *(variable) |  |         |            |       |
| $G_3$ |   | $r_{11}$ | −23.39904 |     |     |         |            |       |
|     |     |     |           | $d_{11}$ | 0.9 | $N_7$ | 1.80500 | $\nu_7$ | 40.97 |
|     |     | $r_{12}$ | −340.72686 |    |     |         |            |       |
|     |     |     |           | $d_{12}$ | *(variable) |  |         |            |       |
| $G_4$ |   | $r_{13}$ | 64.86738 |       |     |         |            |       |
|     |     |     |           | $d_{13}$ | 4.0 | $N_8$ | 1.77250 | $\nu_8$ | 49.77 |
|     |     | $r_{14}$ | −23.47176 |     |     |         |            |       |
|     |     |     |           | $d_{14}$ | 0.2 |       |         |            |       |
| S   |     | $r_{15}$ | (aperture) |      |     |         |            |       |
|     |     |     |           | $d_{15}$ | 2.0 |       |         |            |       |
|     |     | $r_{16}$ | 25.91534 |       |     |         |            |       |
|     |     |     |           | $d_{16}$ | 3.8 | $N_9$ | 1.71300 | $\nu_9$ | 53.93 |
|     |     | $r_{17}$ | −78.84303 |      |     |         |            |       |
|     |     |     |           | $d_{17}$ | 2.1 |       |         |            |       |
|     |     | $r_{18}$ | −17.04538 |      |     |         |            |       |
|     | $G_{5A}$ |   |           | $d_{18}$ | 0.8 | $N_{10}$ | 1.80741 | $\nu_{10}$ | 31.59 |
|     |     | $r_{19}$ | −149.8575 |       |     |         |            |       |
|     |     |     |           | $d_{19}$ | 7.3 |       |         |            |       |
|     |     | $r_{20}$ | 66.46170 |       |     |         |            |       |
| $G_5$ |   |     |           | $d_{20}$ | 4.0 | $N_{11}$ | 1.69350 | $\nu_{11}$ | 50.29 |
|     |     | $r_{21}$ | −23.45352 |      |     |         |            |       |
|     |     |     |           | $d_{21}$ | 0.48 |      |         |            |       |
|     |     | $r_{22}$ | 39.58129 |       |     |         |            |       |
|     |     |     |           | $d_{22}$ | 0.8 | $N_{12}$ | 1.80518 | $\nu_{12}$ | 25.43 |
|     | $G_{5B}$ | $r_{23}$ | 11.73938 |   |     |         |            |       |
|     |     |     |           | $d_{23}$ | 3.14 |     |         |            |       |
|     |     | $r_{24}$ | 17.08209 |       |     |         |            |       |
|     |     |     |           | $d_{24}$ | 3.8 | $N_{13}$ | 1.72000 | $\nu_{13}$ | 50.31 |
|     |     | $r_{25}$ | −86.94366 |      |     |         |            |       |
|     |     |     |           | $d_{25}$ | 5.14 |     |         |            |       |
| F&P |   | $r_{26}$ | ∞ |              |     |         |            |       |
|     |     |     |           | $d_{26}$ | 5.5 | $N_{14}$ | 1.51680 | $\nu_{14}$ | 59.48 |
|     |     | $r_{27}$ | ∞ |              |     |         |            |       |

| f | $d_5$* | $d_{10}$* | $d_{12}$* |
|---|--------|-----------|-----------|
| 9.25 | 1.0 | 19.769 | 5.388 |
| 22.0 | 12.951 | 6.858 | 6.348 |

TABLE 3-continued

Embodiment 3

| 52.5 | 20.057 | 4.6 | 1.5 |
|---|---|---|---|

Total length = 96.857
$\phi_4/\phi_{5B} = 1.046$
$|\phi_3| \times d_2 = 0.147$

TABLE 4

Embodiment 4

$f = 9.25-52.5$   $F_{NO} = 1.65-2.06$   $2\omega = 48.32°-9.03°$

| | | Radius of Curvature | | Axial distance | | Refractive index | | Abbe number |
|---|---|---|---|---|---|---|---|---|
| $G_1$ | $r_1$ | 111.11111 | | | | | | |
| | | | $d_1$ | 1.3 | $N_1$ | 1.80518 | $\nu_1$ | 25.43 |
| | $r_2$ | 34.66868 | | | | | | |
| | | | $d_2$ | 5.0 | $N_2$ | 1.51680 | $\nu_2$ | 59.48 |
| | $r_3$ | −62.61592 | | | | | | |
| | | | $d_3$ | 0.1 | | | | |
| | $r_4$ | 25.72661 | | | | | | |
| | | | $d_4$ | 3.0 | $N_3$ | 1.71300 | $\nu_3$ | 53.93 |
| | $r_5$ | 77.14987 | | | | | | |
| | | | $d_5$ | *(variable) | | | | |
| $G_2$ | $r_6$ | 86.74878 | | | | | | |
| | | | $d_6$ | 0.9 | $N_4$ | 1.77250 | $\nu_4$ | 49.77 |
| | $r_7$ | 12.45883 | | | | | | |
| | | | $d_7$ | 2.8 | | | | |
| | $r_8$ | −15.11492 | | | | | | |
| | | | $d_8$ | 0.8 | $N_5$ | 1.71300 | $\nu_5$ | 53.93 |
| | $r_9$ | 13.72752 | | | | | | |
| | | | $d_9$ | 2.8 | $N_6$ | 1.80518 | $\nu_6$ | 25.43 |
| | $r_{10}$ | −64.75453 | | | | | | |
| | | | $d_{10}$ | *(variable) | | | | |
| $G_3$ | $r_{11}$ | −24.87919 | | | | | | |
| | | | $d_{11}$ | 0.9 | $N_7$ | 1.80500 | $\nu_7$ | 40.97 |
| | $r_{12}$ | 497.66673 | | | | | | |
| | | | $d_{12}$ | *(variable) | | | | |
| $G_4$ | $r_{13}$ | 73.27145 | | | | | | |
| | | | $d_{13}$ | 4.0 | $N_8$ | 1.77250 | $\nu_8$ | 49.77 |
| | $r_{14}$ | −26.03654 | | | | | | |
| | | | $d_{14}$ | 0.2 | | | | |
| B | $r_{15}$ | ∞ | | | | | | |
| | | | $d_{15}$ | 3.0 | $N_9$ | 1.51680 | $\nu_9$ | 59.48 |
| | $r_{16}$ | ∞ | | | | | | |
| | | | $d_{16}$ | 1.5 | | | | |
| S | $r_{17}$ | (aperture) | | | | | | |
| | | | $d_{17}$ | 2.0 | | | | |
| $G_5$ / $G_{5A}$ | $r_{18}$ | 26.66839 | | | | | | |
| | | | $d_{18}$ | 3.8 | $N_{10}$ | 1.71300 | $\nu_{10}$ | 53.93 |
| | $r_{19}$ | −85.04530 | | | | | | |
| | | | $d_{19}$ | 2.1 | | | | |
| | $r_{20}$ | −18.406 | | | | | | |
| | | | $d_{20}$ | 0.8 | $N_{11}$ | 1.80741 | $\nu_{11}$ | 31.59 |
| | $r_{21}$ | −211.78858 | | | | | | |
| | | | $d_{21}$ | 9.0 | | | | |
| $G_{5B}$ | $r_{22}$ | 69.30559 | | | | | | |
| | | | $d_{22}$ | 4.0 | $N_{12}$ | 1.69350 | $\nu_{12}$ | 50.29 |
| | $r_{23}$ | −25.44289 | | | | | | |
| | | | $d_{23}$ | 0.48 | | | | |
| | $r_{24}$ | 37.72260 | | | | | | |
| | | | $d_{24}$ | 0.8 | $N_{13}$ | 1.80518 | $\nu_{13}$ | 25.43 |
| | $r_{25}$ | 12.39299 | | | | | | |
| | | | $d_{25}$ | 3.14 | | | | |
| | $r_{26}$ | 16.87361 | | | | | | |
| | | | $d_{26}$ | 3.8 | $N_{14}$ | 1.72000 | $\nu_{14}$ | 50.31 |
| | $r_{27}$ | −97.49989 | | | | | | |
| | | | $d_{27}$ | 5.14 | | | | |
| F&P | $r_{28}$ | ∞ | | | | | | |
| | | | $d_{28}$ | 5.5 | $N_{15}$ | 1.51680 | $\nu_{15}$ | 59.48 |
| | $r_{29}$ | ∞ | | | | | | |

| f | $d_5$* | $d_{10}$* | $d_{12}$* |
|---|---|---|---|
| 9.25 | 1.0 | 20.145 | 5.589 |
| 22.0 | 12.902 | 7.580 | 6.253 |
| 52.5 | 19.934 | 5.3 | 1.5 |

Total length = 104.934
$\phi_4/\phi_{5B} = 0.916$
$|\phi_3| \times d_2 = 0.180$

TABLE 5

Embodiment 5 f = 9.25–52.5    $F_{NO}$ = 1.65–2.09    2ω = 48.32°–9.03°

| | | Radius of Curvature | Axial distance | | Refractive index | | Abbe number |
|---|---|---|---|---|---|---|---|
| $G_1$ | $r_1$ | 109.121 | | | | | |
| | | | $d_1$ | 1.3 | $N_1$ 1.80518 | $\nu_1$ | 25.43 |
| | $r_2$ | 36.381 | | | | | |
| | | | $d_2$ | 5.5 | $N_2$ 1.51680 | $\nu_2$ | 59.48 |
| | $r_3$ | −65.769 | | | | | |
| | | | $d_3$ | 0.1 | | | |
| | $r_4$ | 26.675 | | | | | |
| | | | $d_4$ | 3.3 | $N_3$ 1.71300 | $\nu_3$ | 53.93 |
| | $r_5$ | 74.031 | | | | | |
| | | | $d_5$ | *(variable) | | | |
| $G_2$ | $r_6$ | 237.534 | | | | | |
| | | | $d_6$ | 0.9 | $N_4$ 1.77250 | $\nu_4$ | 49.77 |
| | $r_7$ | 12.54 | | | | | |
| | | | $d_7$ | 2.6 | | | |
| | $r_8$ | −15.531 | | | | | |
| | | | $d_8$ | 0.8 | $N_5$ 1.71300 | $\nu_5$ | 53.93 |
| | $r_9$ | 15.531 | | | | | |
| | | | $d_9$ | 2.8 | $N_6$ 1.80518 | $\nu_6$ | 25.43 |
| | $r_{10}$ | −148.159 | | | | | |
| | | | $d_{10}$ | *(variable) | | | |
| $G_3$ | $r_{11}$ | −19.151 | | | | | |
| | | | $d_{11}$ | 0.9 | $N_7$ 1.80500 | $\nu_7$ | 40.97 |
| | $r_{12}$ | −148.939 | | | | | |
| | | | $d_{12}$ | *(variable) | | | |
| $G_4$ | $r_{13}$ | −570.288 | | | | | |
| | | | $d_{13}$ | 3.3 | $N_8$ 1.67000 | $\nu_8$ | 57.07 |
| | $r_{14}$ | −20.637 | | | | | |
| | | | $d_{14}$ | 0.1 | | | |
| | $r_{15}$ | 45.6 | | | | | |
| | | | $d_{15}$ | 3.0 | $N_9$ 1.69100 | $\nu_9$ | 54.75 |
| | $r_{16}$ | −45.6 | | | | | |
| | | | $d_{16}$ | 0.2 | | | |
| B | $r_{17}$ | ∞ | | | | | |
| | | | $d_{17}$ | 5.0 | $N_{10}$ 1.51680 | $\nu_{10}$ | 64.12 |
| | $r_{18}$ | ∞ | | | | | |
| | | | $d_{18}$ | 1.5 | | | |
| | $r_{19}$ | (aperture) | | | | | |
| | | | $d_{19}$ | 2.5 | | | |
| $G_5$ $G_{5A}$ | $r_{20}$ | 24.367 | | | | | |
| | | | $d_{20}$ | 2.8 | $N_{11}$ 1.71300 | $\nu_{11}$ | 53.93 |
| | $r_{21}$ | 77.721 | | | | | |
| | | | $d_{21}$ | 1.9 | | | |
| | $r_{22}$ | −20.763 | | | | | |
| | | | $d_{22}$ | 0.8 | $N_{12}$ 1.80518 | $\nu_{12}$ | 25.43 |
| | $r_{23}$ | −83.348 | | | | | |
| | | | $d_{23}$ | 8.0 | | | |
| $G_{5B}$ | $r_{24}$ | ∞ | | | | | |
| | | | $d_{24}$ | 3.0 | $N_{13}$ 1.69100 | $\nu_{13}$ | 54.75 |
| | $r_{25}$ | −24.818 | | | | | |
| | | | $d_{25}$ | 0.3 | | | |
| | $r_{26}$ | 23.681 | | | | | |
| | | | $d_{26}$ | 0.95 | $N_{14}$ 1.80518 | $\nu_{14}$ | 25.43 |
| | $r_{27}$ | 12.381 | | | | | |
| | | | $d_{27}$ | 3.2 | | | |
| | $r_{28}$ | 19.858 | | | | | |
| | | | $d_{28}$ | 3.3 | $N_{15}$ 1.69100 | $\nu_{15}$ | 54.75 |
| | $r_{29}$ | −118.11103 | | | | | |
| | | | $d_{29}$ | 11.097 | | | |
| F | $r_{30}$ | ∞ | | | | | |
| | | | $d_{30}$ | 3.6 | $N_{16}$ 1.51680 | $\nu_{16}$ | 64.12 |
| | $r_{31}$ | ∞ | | | | | |
| | | | $d_{31}$ | 1.65 | | | |
| P | $r_{32}$ | ∞ | | | | | |
| | | | $d_{32}$ | 1.35 | $N_{17}$ 1.517 | $\nu_{17}$ | 64.12 |
| | $r_{33}$ | ∞ | | | | | |

| f | $d_5$* | $d_{10}$* | $d_{12}$* |
|---|---|---|---|
| 9.25 | 1.0 | 24.338 | 1.593 |
| 22.0 | 12.902 | 10.035 | 3.270 |
| 52.5 | 21.270 | 4.117 | 1.5 |

Total length = 102.624
$\phi_4/\phi_{5B}$ = 1.513
$|\phi_3| \times d_2$ = 0.150

TABLE 6

Embodiment 6 f = 8.7–49.7   $F_{NO}$ = 1.22–1.78   2ω = 51.00°–9.54°

| | | | Radius of Curvature | Axial distance | | Refractive index | | Abbe number |
|---|---|---|---|---|---|---|---|---|
| $G_1$ | | $r_1$ | 111.11111 | | | | | |
| | | | | $d_1$ 1.6 | $N_1$ | 1.80518 | $\nu_1$ | 25.43 |
| | | $r_2$ | 36.94311 | | | | | |
| | | | | $d_2$ 7.0 | $N_2$ | 1.51680 | $\nu_2$ | 59.48 |
| | | $r_3$ | −68.57558 | | | | | |
| | | | | $d_3$ 0.1 | | | | |
| | | $r_4$ | 27.50053 | | | | | |
| | | | | $d_4$ 4.0 | $N_3$ | 1.71300 | $\nu_3$ | 53.93 |
| | | $r_5$ | 77.06421 | | | | | |
| | | | | $d_5$ *(variable) | | | | |
| $G_2$ | | $r_6$ | 277.75463 | | | | | |
| | | | | $d_6$ 0.8 | $N_4$ | 1.78831 | $\nu_4$ | 47.32 |
| | | $r_7$ | 12.45305 | | | | | |
| | | | | $d_7$ 3.2 | | | | |
| | | $r_8$ | −16.0993 | | | | | |
| | | | | $d_8$ 0.9 | $N_5$ | 1.71300 | $\nu_5$ | 53.93 |
| | | $r_9$ | 14.08035 | | | | | |
| | | | | $d_9$ 3.55 | $N_6$ | 1.80518 | $\nu_6$ | 25.43 |
| | | $r_{10}$ | −112.02519 | | | | | |
| | | | | $d_{10}$ *(variable) | | | | |
| $G_3$ | | $r_{11}$ | −21.44838 | | | | | |
| | | | | $d_{11}$ 0.8 | $N_7$ | 1.80500 | $\nu_7$ | 40.97 |
| | | $r_{12}$ | −231.70922 | | | | | |
| | | | | $d_{12}$ *(variable) | | | | |
| $G_4$ | | $r_{13}$ | −422.72931 | | | | | |
| | | | | $d_{13}$ 4.4 | $N_8$ | 1.71300 | $\nu_8$ | 53.93 |
| | | $r_{14}$ | −23.86806 | | | | | |
| | | | | $d_{14}$ 0.1 | | | | |
| | | $r_{15}$ | 58.06567 | | | | | |
| | | | | $d_{15}$ 3.4 | $N_9$ | 1.71300 | $\nu_9$ | 53.93 |
| | | $r_{16}$ | −65.20154 | | | | | |
| | | | | $d_{16}$ 0.1 | | | | |
| B | | $r_{17}$ | ∞ | | | | | |
| | | | | $d_{17}$ 5.0 | $N_{10}$ | 1.51680 | $\nu_{10}$ | 64.12 |
| | | $r_{18}$ | ∞ | | | | | |
| | | | | $d_{18}$ 1.5 | | | | |
| | | $r_{19}$ | (aperture) | | | | | |
| | | | | $d_{19}$ 2.5 | | | | |
| $G_5$ | $G_{5A}$ | $r_{20}$ | 29.24549 | | | | | |
| | | | | $d_{20}$ 3.4 | $N_{11}$ | 1.69100 | $\nu_{11}$ | 54.75 |
| | | $r_{21}$ | 123.85527 | | | | | |
| | | | | $d_{21}$ 3.0 | | | | |
| | | $r_{22}$ | −21.05501 | | | | | |
| | | | | $d_{22}$ 1.1 | $N_{12}$ | 1.80518 | $\nu_{12}$ | 25.43 |
| | | $r_{23}$ | −116.48536 | | | | | |
| | | | | $d_{23}$ 9.0 | | | | |
| | $G_{5B}$ | $r_{24}$ | 64.19676 | | | | | |
| | | | | $d_{24}$ 3.8 | $N_{13}$ | 1.69100 | $\nu_{13}$ | 54.75 |
| | | $r_{25}$ | −31.37041 | | | | | |
| | | | | $d_{25}$ 0.1 | | | | |
| | | $r_{26}$ | 26.73822 | | | | | |
| | | | | $d_{26}$ 1.0 | $N_{14}$ | 1.80518 | $\nu_{14}$ | 25.43 |
| | | $r_{27}$ | 13.17440 | | | | | |
| | | | | $d_{27}$ 3.6 | | | | |
| | | $r_{28}$ | 19.12575 | | | | | |
| | | | | $d_{28}$ 4.5 | $N_{15}$ | 1.71300 | $\nu_{15}$ | 53.93 |
| | | $r_{29}$ | −111.01341 | | | | | |
| | | | | $d_{29}$ 6.56 | | | | |
| F | | $r_{30}$ | ∞ | | | | | |
| | | | | $d_{30}$ 2.5 | $N_{16}$ | 1.51680 | $\nu_{16}$ | 64.12 |
| | | $r_{31}$ | ∞ | | | | | |
| | | | | $d_{31}$ 3.83 | | | | |
| P | | $r_{32}$ | ∞ | | | | | |
| | | | | $d_{32}$ 1.5 | $N_{17}$ | 1.51680 | $\nu_{17}$ | 64.12 |
| | | $r_{33}$ | ∞ | | | | | |

| f | $d_5$* | $d_{10}$* | $d_{12}$* |
|---|---|---|---|
| 9.25 | 1.0 | 24.716 | 1.846 |
| 22.0 | 13.459 | 10.477 | 3.626 |
| 52.5 | 21.661 | 4.2 | 1.700 |

Total length = 114.218
$\phi_4/\phi_{5B} = 1.219$
$|\phi_3| \times d_2 = 0.143$

TABLE 7

Embodiment 7

$f = 9.25-52.5 \quad F_{NO} = 1.68-2.08 \quad 2\omega = 48.32°-9.03°$

| | | | Radius of Curvature | Axial distance | | Refractive index | | Abbe number |
|---|---|---|---|---|---|---|---|---|
| G$_1$ | | r$_1$ | 109.10718 | | | | | |
| | | | | d$_1$ 1.3 | N$_1$ | 1.80518 | ν$_1$ | 25.43 |
| | | r$_2$ | 36.41112 | | | | | |
| | | | | d$_2$ 5.5 | N$_2$ | 1.51680 | ν$_2$ | 59.48 |
| | | r$_3$ | −64.90645 | | | | | |
| | | | | d$_3$ 0.1 | | | | |
| | | r$_4$ | 26.50369 | | | | | |
| | | | | d$_4$ 3.3 | N$_3$ | 1.71300 | ν$_3$ | 53.93 |
| | | r$_5$ | 71.87697 | | | | | |
| | | | | d$_5$ *(variable) | | | | |
| G$_2$ | | r$_6$ | 237.23442 | | | | | |
| | | | | d$_6$ 0.9 | N$_4$ | 1.77250 | ν$_4$ | 49.77 |
| | | r$_7$ | 12.66557 | | | | | |
| | | | | d$_7$ 2.6 | | | | |
| | | r$_8$ | −15.60426 | | | | | |
| | | | | d$_8$ 0.8 | N$_5$ | 1.71300 | ν$_5$ | 53.93 |
| | | r$_9$ | 15.60426 | | | | | |
| | | | | d$_9$ 2.8 | N$_6$ | 1.80518 | ν$_6$ | 25.43 |
| | | r$_{10}$ | −156.08413 | | | | | |
| | | | | d$_{10}$ *(variable) | | | | |
| G$_3$ | | r$_{11}$ | −19.26521 | | | | | |
| | | | | d$_{11}$ 0.9 | N$_7$ | 1.80500 | ν$_7$ | 40.97 |
| | | r$_{12}$ | −171.73288 | | | | | |
| | | | | d$_{12}$ *(variable) | | | | |
| G$_4$ | | r$_{13}$ | −643.67461 | | | | | |
| | | | | d$_{13}$ 3.3 | N$_8$ | 1.67000 | ν$_8$ | 57.07 |
| | | r$_{14}$ | −20.88796 | | | | | |
| | | | | d$_{14}$ 0.1 | | | | |
| | | r$_{15}$ | 45.26626 | | | | | |
| | | | | d$_{15}$ 3.0 | N$_9$ | 1.69100 | ν$_9$ | 54.75 |
| | | r$_{16}$ | −45.26626 | | | | | |
| | | | | d$_{16}$ 0.2 | | | | |
| B | | r$_{17}$ | ∞ | | | | | |
| | | | | d$_{17}$ 5.0 | N$_{10}$ | 1.51680 | ν$_{10}$ | 64.12 |
| | | r$_{18}$ | ∞ | | | | | |
| | | | | d$_{18}$ 1.5 | | | | |
| S | | r$_{19}$ | (aperture) | | | | | |
| | | | | d$_{19}$ 2.5 | | | | |
| G$_5$ | G$_{5A}$ | r$_{20}$ | 24.41512 | | | | | |
| | | | | d$_{20}$ 2.8 | N$_{11}$ | 1.71300 | ν$_{11}$ | 53.93 |
| | | r$_{21}$ | 82.56527 | | | | | |
| | | | | d$_{21}$ 2.1 | | | | |
| | | r$_{22}$ | −20.78909 | | | | | |
| | | | | d$_{22}$ 0.8 | N$_{12}$ | 1.80518 | ν$_{12}$ | 25.43 |
| | | r$_{23}$ | −86.41033 | | | | | |
| | | | | d$_{23}$ 8.0 | | | | |
| | G$_{5B}$ | r$_{24}$ | ∞ | | | | | |
| | | | | d$_{24}$ 3.0 | N$_{13}$ | 1.69100 | ν$_{13}$ | 54.75 |
| | | r$_{25}$ | −24.72725 | | | | | |
| | | | | d$_{25}$ 0.3 | | | | |
| | | r$_{26}$ | 23.41492 | | | | | |
| | | | | d$_{26}$ 0.95 | N$_{14}$ | 1.80518 | ν$_{14}$ | 25.43 |
| | | r$_{27}$ | 12.22804 | | | | | |
| | | | | d$_{27}$ 3.2 | | | | |
| | | r$_{28}$ | 19.35767 | | | | | |
| | | | | d$_{28}$ 3.3 | N$_{15}$ | 1.69100 | ν$_{15}$ | 54.75 |
| | | r$_{29}$ | −125.57673 | | | | | |
| | | | | d$_{29}$ 5.14 | | | | |
| F&P | | r$_{30}$ | ∞ | | | | | |
| | | | | d$_{30}$ 5.3 | N$_{16}$ | 1.51680 | ν$_{16}$ | 64.12 |
| | | r$_{31}$ | ∞ | | | | | |

| f | d$_5$* | d$_{10}$* | d$_{12}$* |
|---|---|---|---|
| 9.25 | 0.999 | 24.262 | 1.656 |
| 22.0 | 13.551 | 10.056 | 3.31 |
| 52.5 | 21.217 | 4.2 | 1.5 |

Total length = 102.671
φ$_4$/φ$_{5B}$ = 1.579
|φ$_3$|X d$_2$ = 0.155

TABLE 8

Embodiment 8

$f = 10.3-58.2 \quad F_{NO} = 1.65-2.52 \quad 2\omega = 43.89°-8.15°$

| Radius of | | Refractive | Abbe |

TABLE 8-continued

Embodiment 8

| | | Curvature | | Axial distance | index | | number | |
|---|---|---|---|---|---|---|---|---|
| | $r_1$ | 111.20366 | | | | | | |
| | | | $d_1$ | 1.3 | $N_1$ | 1.80518 | $\nu_1$ | 25.43 |
| | $r_2$ | 34.69813 | | | | | | |
| | | | $d_2$ | 4.8 | $N_2$ | 1.51680 | $\nu_2$ | 59.48 |
| $G_1$ | $r_3$ | −9.93388 | | | | | | |
| | | | $d_3$ | 0.1 | | | | |
| | $r_4$ | 26.52133 | | | | | | |
| | | | $d_4$ | 3.0 | $N_3$ | 1.71300 | $\nu_3$ | 53.93 |
| | $r_5$ | 96.19490 | | | | | | |
| | | | $d_5$ | *(variable) | | | | |
| | $r_6$ | 202.84511 | | | | | | |
| | | | $d_6$ | 0.9 | $N_4$ | 1.77250 | $\nu_4$ | 49.77 |
| | $r_7$ | 12.78211 | | | | | | |
| | | | $d_7$ | 2.6 | | | | |
| $G_2$ | $r_8$ | −15.66182 | | | | | | |
| | | | $d_8$ | 0.8 | $N_5$ | 1.71300 | $\nu_5$ | 53.93 |
| | $r_9$ | 14.53013 | | | | | | |
| | | | $d_9$ | 2.8 | $N_6$ | 1.80518 | $\nu_6$ | 25.43 |
| | $r_{10}$ | −63.86742 | | | | | | |
| | | | $d_{10}$ | *(variable) | | | | |
| $G_3$ | $r_{11}$ | −24.06913 | | | | | | |
| | | | $d_{11}$ | 0.9 | $N_7$ | 1.80518 | $\nu_7$ | 40.97 |
| | $r_{12}$ | −566.25558 | | | | | | |
| | | | $d_{12}$ | *(variable) | | | | |
| | $r_{13}$ | 377.60215 | | | | | | |
| | | | $d_{13}$ | 3.0 | $N_8$ | 1.67000 | $\nu_8$ | 57.07 |
| | $r_{14}$ | −25.74103 | | | | | | |
| $G_4$ | | | $d_{14}$ | 0.1 | | | | |
| | $r_{15}$ | 39.80310 | | | | | | |
| | | | $d_{15}$ | 3.0 | $N_9$ | 1.69100 | $\nu_9$ | 54.75 |
| | $r_{16}$ | −87.87264 | | | | | | |
| | | | $d_{16}$ | 0.2 | | | | |
| B | $r_{17}$ | ∞ | | | | | | |
| | | | $d_{17}$ | 5.0 | $N_{10}$ | 1.51680 | $\nu_{10}$ | 64.12 |
| | $r_{18}$ | ∞ | | | | | | |
| | | | $d_{18}$ | 1.5 | | | | |
| S | $r_{19}$ | (aperture) | | | | | | |
| | | | $d_{19}$ | 2.5 | | | | |
| | $r_{20}$ | 27.75761 | | | | | | |
| | | | $d_{20}$ | 2.8 | $N_{11}$ | 1.71300 | $\nu_{11}$ | 53.93 |
| | $r_{21}$ | 69.57175 | | | | | | |
| $G_{5A}$ | | | $d_{21}$ | 2.1 | | | | |
| | $r_{22}$ | −22.49059 | | | | | | |
| | | | $d_{22}$ | 0.8 | $N_{12}$ | 1.80518 | $\nu_{12}$ | 25.43 |
| | $r_{23}$ | −275.59825 | | | | | | |
| | | | $d_{23}$ | 7.7 | | | | |
| $G_5$ | $r_{24}$ | 259.97120 | | | | | | |
| | | | $d_{24}$ | 3.0 | $N_{13}$ | 1.71300 | $\nu_{13}$ | 53.93 |
| | $r_{25}$ | −27.86643 | | | | | | |
| | | | $d_{25}$ | 0.29 | | | | |
| | $r_{26}$ | 28.93603 | | | | | | |
| $G_{5B}$ | | | $d_{26}$ | 0.95 | $N_{14}$ | 1.80518 | $\nu_{14}$ | 25.43 |
| | $r_{27}$ | 13.76125 | | | | | | |
| | | | $d_{27}$ | 3.19 | | | | |
| | $r_{28}$ | 18.41933 | | | | | | |
| | | | $d_{28}$ | 3.3 | $N_{15}$ | 1.72000 | $\nu_{15}$ | 50.31 |
| | $r_{29}$ | −137.38927 | | | | | | |
| | | | $d_{29}$ | 4.0 | | | | |
| F&P | $r_{30}$ | ∞ | | | | | | |
| | | | $d_{30}$ | 5.5 | $N_{16}$ | 1.51680 | $\nu_{16}$ | 64.12 |
| | $r_{31}$ | ∞ | | | | | | |

| f | $d_5$* | $d_{10}$* | $d_{12}$* |
|---|---|---|---|
| 10.3 | 1.0 | 20.064 | 5.203 |
| 24.0 | 12.804 | 7.229 | 6.234 |
| 58.2 | 20.167 | 4.6 | 1.5 |

Total length = 104.169
$\phi_4/\phi_{5B} = 1.246$
$|\phi_3| \times d_2 = 0.147$

TABLE 9

Embodiment 9 f = 10.2−58.2   $F_{NO}$ = 1.65−2.29   $2\omega$ = 43.89°−8.15°

| | Radius of Curvature | Axial distance | Refractive index | Abbe number |
|---|---|---|---|---|
| $r_1$ | 59.88512 | | | |

TABLE 9-continued

Embodiment 9

| | | | | | | | | |
|---|---|---|---|---|---|---|---|---|
| G$_1$ | r$_2$ | 26.62308 | d$_1$ | 1.3 | N$_1$ | 1.80518 | ν$_1$ | 25.43 |
| | r$_3$ | −339.86208 | d$_2$ | 5.0 | N$_2$ | 1.67000 | ν$_2$ | 57.07 |
| | r$_4$ | 32.52744 | d$_3$ | 0.1 | | | | |
| | r$_5$ | 144.51131 | d$_4$ | 3.3 | N$_3$ | 1.67000 | ν$_3$ | 57.05 |
| | | | d$_5$ | *(variable) | | | | |
| G$_2$ | r$_6$ | 34.46516 | | | | | | |
| | r$_7$ | 11.88443 | d$_6$ | 0.8 | N$_4$ | 1.77250 | ν$_4$ | 49.77 |
| | r$_8$ | −15.41852 | d$_7$ | 2.4 | | | | |
| | r$_9$ | 11.33338 | d$_8$ | 0.8 | N$_5$ | 1.71300 | ν$_5$ | 53.93 |
| | r$_{10}$ | 174.68456 | d$_9$ | 3.0 | N$_6$ | 1.80518 | ν$_6$ | 25.43 |
| | | | d$_{10}$ | *(variable) | | | | |
| G$_3$ | r$_{11}$ | −19.04360 | d$_{11}$ | 0.9 | N$_7$ | 1.80500 | ν$_7$ | 40.97 |
| | r$_{12}$ | −121.38771 | d$_{12}$ | *(variable) | | | | |
| G$_4$ | r$_{13}$ | 289.67329 | d$_{13}$ | 3.5 | N$_8$ | 1.51680 | ν$_8$ | 64.12 |
| | r$_{14}$ | −22.11 | d$_{14}$ | 0.1 | | | | |
| | r$_{15}$ | 51.52945 | d$_{15}$ | 3.0 | N$_9$ | 1.51680 | ν$_9$ | 64.12 |
| | r$_{16}$ | −53.31625 | d$_{16}$ | 0.2 | | | | |
| B | r$_{17}$ | ∞ | d$_{17}$ | 5.0 | N$_{10}$ | 1.51680 | ν$_{10}$ | 64.12 |
| | r$_{18}$ | ∞ | | | | | | |
| S | r$_{19}$ | (aperture) | d$_{18}$ | 1.5 | | | | |
| G$_5$ G$_{5A}$ | r$_{20}$ | 23.38174 | d$_{19}$ | 2.0 | | | | |
| | r$_{21}$ | 1029.52683 | d$_{20}$ | 3.8 | N$_{11}$ | 1.71300 | ν$_{11}$ | 53.93 |
| | r$_{22}$ | −24.94138 | d$_{21}$ | 2.1 | | | | |
| | r$_{23}$ | −255.50616 | d$_{22}$ | 0.8 | N$_{12}$ | 1.80741 | ν$_{12}$ | 31.59 |
| G$_{5B}$ | r$_{24}$ | 51.57606 | d$_{23}$ | 7.3 | | | | |
| | r$_{25}$ | −33.78966 | d$_{24}$ | 4.0 | N$_{13}$ | 1.69350 | ν$_{13}$ | 50.29 |
| | r$_{26}$ | 24.04665 | d$_{25}$ | 0.48 | | | | |
| | r$_{27}$ | 11.31374 | d$_{26}$ | 0.8 | N$_{14}$ | 1.80518 | ν$_{14}$ | 25.43 |
| | r$_{28}$ | 16.49230 | d$_{27}$ | 3.14 | | | | |
| | r$_{29}$ | 132.83665 | d$_{28}$ | 3.8 | N$_{15}$ | 1.72000 | ν$_{15}$ | 50.31 |
| F&P | r$_{30}$ | ∞ | d$_{29}$ | 5.14 | | | | |
| | r$_{31}$ | ∞ | d$_{30}$ | 5.5 | N$_{16}$ | 1.51680 | ν$_{16}$ | 64.12 |

| f | d$_5$* | d$_{10}$* | d$_{12}$* |
|---|---|---|---|
| 10.2 | 1.0 | 18.795 | 5.332 |
| 24.0 | 12.009 | 6.909 | 6.209 |
| 58.2 | 18.927 | 4.5 | 1.7 |

Total length = 102.747
φ$_4$/φ$_{5B}$ = 1.244
|φ$_3$|X d$_2$ = 0.160

What is claimed is:

1. A compact zoom lens system for a video camera, comprising from the object side to the image side:
   a first lens unit of a positive refractive power fixed on the optical axis of the lens system;
   a second lens unit of a negative refractive power shiftable along the optical axis in the zooming operation;
   a third lens unit of a negative refractive power shiftable along the optical axis in the zooming operation and in the focusing operation;
   a fourth lens unit of a positive refractive power fixed on the optical axis of the lens system and consisting of one positive lens component;
   an aperture diaphragm, and a fifth lens unit including a front lens unit consisting of a positive lens component whose object side surface has a stronger refractive power than its image side surface and a negative lens component whose object side surface has a stronger refractive power than its image side surface, and a rear lens unit of a positive refractive power consisting of a positive lens component, a negative meniscus lens component whose object side surface has a stronger refractive power than its image side surface, and a positive lens component whose object side surface has a stronger refractive power than its image side surface;

wherein the lens system fulfills the following condition:

$$0.13 < |\phi_3 \times d_2| < 0.20$$

wherein:
$\phi_3$ represents the refractive power of the third lens unit, and
$d_2$ represents the axial distance between the second lens unit and the third lens unit at the infinity focusing position in the longest focal length condition.

2. A compact zoom lens system for a video camera, comprising from the object side to the image side:
a first lens unit of a positive refractive power fixed on the optical axis of the lens system;
a second lens unit of a negative refractive power shiftable along the optical axis in the zooming operation;
a third lens unit of a negative refractive power shiftable along the optical axis in the zooming operation and in the focusing operation;
a fourth lens unit of a positive refractive power fixed on the optical axis of the lens system and including at most two positive lens components;
an aperture diaphragm; and
a fifth lens unit including a front lens unit consisting of a positive lens component whose object side surface has stronger refractive power than its image side surface and a negative lens component whose object side surface has a stronger refractive power than its image side surface, and a rear lens unit of a positive refractive power consisting of a positive lens component, a negative meniscus lens component whose object side surface has a stronger refractive power than its image side surface and a positive lens component whose object side surface has a stronger refractive power than its image side surface;
wherein the lens system fulfills the following conditions;

$$0.72 < \phi_4/\phi_{5B} < 2.0$$

$$0.13 < |\phi_3| \times d_2 < 0.20$$

wherein;
$\phi_4$ represents the refractive power of the fourth lens unit;
$\phi_{5B}$ represents the refractive power of the rear lens unit of the fifth lens unit;
$\phi_3$ represents the refractive power of the third lens unit; and
$d_2$ represents the axial distance between the second lens unit and the third lens unit at the infinity focusing position in the longest focal length condition.

3. A compact zoom lens system as claimed in claim 2, wherein the fourth lens unit consists of one positive lens component.

4. A compact zoom lens system as claimed in claim 3, wherein the lens system further fulfills the following condition:

$$0.72 < \phi_4/\phi_{5B} < 1.18.$$

5. A compact zoom lens system as claimed in claim 4, wherein the lens system is defined by the following design parameters;

| f = 9.25–52.5 | $F_{NO}$ = 1.65–2.06 | | $2\omega$ = 48.32°–9.03° | |
|---|---|---|---|---|
| Radius of Curvature | Axial distance | | Refractive index | Abbe number |
| $r_1$ 111.11111 | | | | |
| | $d_1$ | 1.3 | $N_1$ 1.80518 | $\nu_1$ 25.43 |
| $r_2$ 34.48986 | | | | |
| | $d_2$ | 4.8 | $N_2$ 1.51680 | $\nu_2$ 59.48 |
| $r_3$ −62.08512 | | | | |
| | $d_3$ | 0.1 | | |
| $r_4$ 25.48095 | | | | |
| | $d_4$ | 3.0 | $N_3$ 1.71300 | $\nu_3$ 53.93 |
| $r_5$ 74.57397 | | | | |
| | $d_5$ | *(variable) | | |
| $r_6$ 82.37049 | | | | |
| | $d_6$ | 0.9 | $N_4$ 1.77250 | $\nu_4$ 49.77 |
| $r_7$ 12.36447 | | | | |
| | $d_7$ | 2.8 | | |
| $r_8$ −14.74083 | | | | |
| | $d_8$ | 0.8 | $N_5$ 1.71300 | $\nu_5$ 53.93 |
| $r_9$ 13.77726 | | | | |
| | $d_9$ | 2.8 | $N_6$ 1.80518 | $\nu_6$ 25.43 |
| $r_{10}$ −67.43370 | | | | |
| | $d_{10}$ | *(variable) | | |
| $r_{11}$ −25.54968 | | | | |
| | $d_{11}$ | 0.9 | $N_7$ 1.80500 | $\nu_7$ 40.97 |
| $r_{12}$ 1659.35101 | | | | |
| | $d_{12}$ | *(variable) | | |
| $r_{13}$ 68.25202 | | | | |
| | $d_{13}$ | 4.0 | $N_8$ 1.77250 | $\nu_8$ 49.77 |
| $r_{14}$ −27.14722 | | | | |
| | $d_{14}$ | 0.2 | | |
| $r_{15}$ ∞ | | | | |
| | $d_{15}$ | 5.0 | $N_9$ 1.51680 | $\nu_9$ 59.48 |
| $r_{16}$ ∞ | | | | |
| | $d_{16}$ | 1.5 | | |
| $r_{17}$ (aperture) | | | | |
| | $d_{17}$ | 2.0 | | |
| $r_{18}$ 26.02677 | | | | |
| | $d_{18}$ | 3.8 | $N_{10}$ 1.71300 | $\nu_{10}$ 53.93 |
| $r_{19}$ −87.96916 | | | | |
| | $d_{19}$ | 2.1 | | |
| $r_{20}$ −17.93750 | | | | |
| | $d_{20}$ | 0.8 | $N_{11}$ 1.80741 | $\nu_{11}$ 31.59 |
| $r_{21}$ −154.14971 | | | | |
| | $d_{21}$ | 8.01 | | |
| $r_{22}$ 72.77422 | | | | |
| | $d_{22}$ | 4.0 | $N_{12}$ 1.69350 | $\nu_{12}$ 50.29 |
| $r_{23}$ −24.53085 | | | | |
| | $d_{23}$ | 0.48 | | |
| $r_{24}$ 38.36134 | | | | |
| | $d_{24}$ | 0.8 | $N_{13}$ 1.80518 | $\nu_{13}$ 25.43 |
| $r_{25}$ 12.22151 | | | | |
| | $d_{25}$ | 3.14 | | |
| $r_{26}$ 16.71555 | | | | |
| | $d_{26}$ | 3.8 | $N_{14}$ 1.72000 | $\nu_{14}$ 50.31 |
| $r_{27}$ −92.99169 | | | | |
| | $d_{27}$ | 5.14 | | |
| $r_{28}$ ∞ | | | | |
| | $d_{28}$ | 5.5 | $N_{15}$ 1.51680 | $\nu_{15}$ 59.48 |
| $r_{29}$ ∞ | | | | |

| f | $d_5$* | $d_{10}$* | $d_{12}$* |
|---|---|---|---|
| 9.25 | 1.0 | 19.534 | 5.528 |
| 22.0 | 12.891 | 6.710 | 6.461 |
| 52.5 | 19.962 | 4.6 | 1.5 | wherein f represents the compound focal length of the whole length system;

$F_{NO}$ represents the F-number of the whole lens system, and $2\omega$ represents the angle of view of the whole lens system.

6. A compact zoom lens system as claimed in claim 2, wherein the fourth lens unit consists of two positive lens components.

7. A compact zoom lens system as claimed in claim 6, wherein the lens system further fulfills the following condition:

$$1.18 < \phi_4/\phi_{5B} < 2.0.$$

8. A compact zoom lens system as claimed in claim 7, wherein the lens system is defined by the following design parameters;

| f = 9.25–52.5 | | $F_{NO}$ = 1.65–2.09 | | $2\omega$ = 48.32°–9.03° | |
|---|---|---|---|---|---|
| | Radius of Curvature | Axial distance | | Refractive index | Abbe number |
| $r_1$ | 109.121 | | | | |
| | | $d_1$ | 1.3 | $N_1$ 1.80518 | $\nu_1$ 25.43 |
| $r_2$ | 36.381 | | | | |
| | | $d_2$ | 5.5 | $N_2$ 1.51680 | $\nu_2$ 59.48 |
| $r_3$ | −65.769 | | | | |
| | | $d_3$ | 0.1 | | |
| $r_4$ | 26.675 | | | | |
| | | $d_4$ | 3.3 | $N_3$ 1.71300 | $\nu_3$ 53.93 |
| $r_5$ | 74.031 | | | | |
| | | $d_5$ | *(variable) | | |
| $r_6$ | 237.534 | | | | |
| | | $d_6$ | 0.9 | $N_4$ 1.77250 | $\nu_4$ 49.77 |
| $r_7$ | 12.54 | | | | |
| | | $d_7$ | 2.6 | | |
| $r_8$ | −15.531 | | | | |
| | | $d_8$ | 0.8 | $N_5$ 1.71300 | $\nu_5$ 53.93 |
| $r_9$ | 15.531 | | | | |
| | | $d_9$ | 2.8 | $N_6$ 1.80518 | $\nu_6$ 25.43 |
| $r_{10}$ | −148.159 | | | | |
| | | $d_{10}$ | *(variable) | | |
| $r_{11}$ | −19.151 | | | | |
| | | $d_{11}$ | 0.9 | $N_7$ 1.80500 | $\nu_7$ 40.97 |
| $r_{12}$ | −148.939 | | | | |
| | | $d_{12}$ | *(variable) | | |
| $r_{13}$ | −570.288 | | | | |
| | | $d_{13}$ | 3.3 | $N_8$ 1.67000 | $\nu_8$ 57.07 |
| $r_{14}$ | −20.637 | | | | |
| | | $d_{14}$ | 0.1 | | |
| $r_{15}$ | 45.6 | | | | |
| | | $d_{15}$ | 3.0 | $N_9$ 1.69100 | $\nu_9$ 54.75 |
| $r_{16}$ | −45.6 | | | | |
| | | $d_{16}$ | 0.2 | | |
| $r_{17}$ | ∞ | | | | |
| | | $d_{17}$ | 5.0 | $N_{10}$ 1.51680 | $\nu_{10}$ 64.12 |
| $r_{18}$ | ∞ | | | | |
| | | $d_{18}$ | 1.5 | | |
| $r_{19}$ | (aperture) | | | | |
| | | $d_{19}$ | 2.5 | | |
| $r_{20}$ | 24.367 | | | | |
| | | $d_{20}$ | 2.8 | $N_{11}$ 1.71300 | $\nu_{11}$ 53.93 |
| $r_{21}$ | 77.721 | | | | |
| | | $d_{21}$ | 1.9 | | |
| $r_{22}$ | −20.763 | | | | |
| | | $d_{22}$ | 0.8 | $N_{12}$ 1.80518 | $\nu_{12}$ 25.43 |
| $r_{23}$ | −83.348 | | | | |
| | | $d_{23}$ | 8.0 | | |
| $r_{24}$ | [0.0] ∞ | | | | |
| | | $d_{24}$ | 3.0 | $N_{13}$ 1.69100 | $\nu_{13}$ 54.75 |
| $r_{25}$ | −24.818 | | | | |
| | | $d_{25}$ | 0.3 | | |
| $r_{26}$ | 23.681 | | | | |
| | | $d_{26}$ | 0.95 | $N_{14}$ 1.80518 | $\nu_{14}$ 25.43 |
| $r_{27}$ | 12.381 | | | | |
| | | $d_{27}$ | 3.2 | | |
| $r_{28}$ | 19.858 | | | | |
| | | $d_{28}$ | 3.3 | $N_{15}$ 1.69100 | $\nu_{15}$ 54.75 |
| $r_{29}$ | −118.11103 | | | | |
| | | $d_{29}$ | 11.097 | | |
| $r_{30}$ | ∞ | | | | |
| | | $d_{30}$ | 3.6 | $N_{16}$ 1.51680 | $\nu_{16}$ 64.12 |
| $r_{31}$ | ∞ | | | | |
| | | $d_{31}$ | 1.65 | | |
| $r_{32}$ | ∞ | | | | |
| | | $d_{32}$ | 1.35 | $N_{17}$ 1.517 | $\nu_{17}$ 64.12 |
| $r_{33}$ | ∞ | | | | |

| f | $d_5$* | $d_{10}$* | $d_{12}$* |
|---|---|---|---|
| 9.25 | 1.0 | 24.338 | 1.593 |
| 22.0 | 12.902 | 10.035 | 3.270 |
| 52.5 | 21.270 | 4.117 | 1.5 | wherein f represents the compound focal length of the whole lens system;

$F_{NO}$ represents the F-number of the whole lens system, and $2\omega$ represents the angle of view of the whole lens system.

* * * * *

UNITED STATES PATENT AND TRADEMARK OFFICE
CERTIFICATE OF CORRECTION

PATENT NO. : 4,824,226
DATED : April 25, 1989
INVENTOR(S) : Tanaka

It is certified that error appears in the above—identified patent and that said Letters Patent is hereby corrected as shown below:

Claim 1:

Column 25, line 9, delete "object" and insert --image--;

line 10, delete "image" and insert --object--.

Claim 2:

Column 25, line 47, delete "object" and insert --image--;

line 48, delete "image" and insert --object--.

Signed and Sealed this

Twentieth Day of February, 1990

Attest:

JEFFREY M. SAMUELS

Attesting Officer     Acting Commissioner of Patents and Trademarks